United States Patent
Yanagizu et al.

(10) Patent No.: US 12,526,906 B2
(45) Date of Patent: Jan. 13, 2026

(54) LAMP

(71) Applicant: KOITO MANUFACTURING CO., LTD., Tokyo (JP)

(72) Inventors: Shohei Yanagizu, Shizuoka (JP); Yu Ota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 93 days.

(21) Appl. No.: 18/579,622

(22) PCT Filed: Jun. 22, 2022

(86) PCT No.: PCT/JP2022/024852
§ 371 (c)(1),
(2) Date: Jan. 16, 2024

(87) PCT Pub. No.: WO2023/286545
PCT Pub. Date: Jan. 19, 2023

(65) Prior Publication Data
US 2024/0334580 A1 Oct. 3, 2024

(30) Foreign Application Priority Data

Jul. 16, 2021 (JP) .................................. 2021-117947
Jul. 26, 2021 (JP) .................................. 2021-121237

(51) Int. Cl.
*H05B 47/28* (2020.01)
*H05B 45/18* (2020.01)
(Continued)

(52) U.S. Cl.
CPC ............. *H05B 47/28* (2020.01); *H05B 45/18* (2020.01); *H05B 45/305* (2020.01);
(Continued)

(58) Field of Classification Search
CPC ........ H05B 45/14; H05B 45/10; H05B 45/46; H05B 45/18; H05B 45/305; H05B 47/165; H05B 47/18
See application file for complete search history.

(56) References Cited

U.S. PATENT DOCUMENTS

| 7,322,718 B2 | 1/2008 | Setomoto et al. |
| 10,470,273 B2 | 11/2019 | Matsui et al. |

(Continued)

FOREIGN PATENT DOCUMENTS

| JP | 2010-166499 A | 7/2010 |
| JP | 2016-066432 A | 4/2016 |

(Continued)

OTHER PUBLICATIONS

Office Action issued in counterpart Japanese Patent Application No. 2021-117947 mailed Aug. 6, 2024 (10 pages).

(Continued)

*Primary Examiner* — Patrick C Chen
(74) *Attorney, Agent, or Firm* — Osha Bergman Watanabe & Burton LLP

(57) ABSTRACT

A lamp includes a power supply circuit, a light source, a control unit, a first temperature detection circuit, and a second temperature detection circuit. The power supply circuit is provided on a first substrate and configured to generate a predetermined voltage based on a power supply voltage. The light source, which is provided on a second substrate, includes a plurality of light-emitting elements and an adjustment unit configured to adjust a drive current flowing through each of the plurality of light-emitting elements, and uses the predetermined voltage as a power supply. The control unit is provided on a third substrate and configured to control the adjustment unit. The first temperature detection circuit is provided on the first substrate and configured to detect a temperature. The second temperature (Continued)

detection circuit is provided on the second substrate and configured to detect a temperature. The control unit is configured to control the adjustment unit based on a detection result having a higher temperature of detection results of the first and second temperature detection circuits and a signal indicating a turn-on condition of the plurality of light-emitting elements.

16 Claims, 25 Drawing Sheets

(51) Int. Cl.
H05B 45/305 (2020.01)
H05B 45/3725 (2020.01)
H05B 45/46 (2020.01)
H05B 47/165 (2020.01)
H05B 47/18 (2020.01)

(52) U.S. Cl.
CPC ......... *H05B 45/3725* (2020.01); *H05B 45/46* (2020.01); *H05B 47/165* (2020.01); *H05B 47/18* (2020.01)

(56) References Cited

U.S. PATENT DOCUMENTS

| 10,935,824 | B2 | 3/2021 | Yoda | |
|---|---|---|---|---|
| 2007/0029950 | A1 | 2/2007 | Jang et al. | |
| 2010/0181507 | A1 | 7/2010 | Maruyama | |
| 2016/0159272 | A1 | 6/2016 | Kataike | |
| 2018/0070416 | A1* | 3/2018 | Kato | B60Q 11/00 |
| 2018/0242421 | A1* | 8/2018 | Ohta | H05B 45/10 |
| 2018/0343722 | A1* | 11/2018 | Matsui | G05F 1/10 |

FOREIGN PATENT DOCUMENTS

| JP | 2016-107743 A | 6/2016 |
|---|---|---|
| JP | 2018-041665 A | 3/2018 |
| JP | 2018-134981 A | 8/2018 |
| WO | 2020-209295 A1 | 10/2020 |

OTHER PUBLICATIONS

International Search Report in corresponding International Application No. PCT/JP2022/024852, dated Aug. 2, 2022 (5 pages).
Written Opinion in corresponding International Application No. PCT/JP2022/024852, dated Aug. 2, 2022 (4 pages).
The extended European search report issued in EP Patent Application No. 22841889.3, mailed on Sep. 25, 2024 (13 pages).

* cited by examiner

LAMP

TECHNICAL FIELD

The present disclosure relates to a lamp.

BACKGROUND ART

For example, as a lamp used for a vehicle (vehicle lamp), there is known a variable light distribution headlamp (adaptive driving beam (ADB)) that variably controls light distribution of a light distribution pattern by arranging a plurality of light-emitting elements side by side and switching turn-on of each light-emitting element (for example, see JP2016-107743A).

SUMMARY OF INVENTION

When a plurality of light-emitting elements are connected in parallel, it is necessary to supply a current (drive current) corresponding to the number of light-emitting elements to be turned on. Therefore, when a large number of light-emitting elements are provided, a large current may be required, and heat generation becomes large, and as a result, electronic components may be thermally destroyed. In addition, when electronic components are provided on a plurality of substrates, the electronic components may generate heat and may be thermally destroyed on each substrate.

The present disclosure has been made in view of the above problems in the related art, and an object of the present disclosure is to provide a lamp capable of preventing heat generation and preventing destroy of an electronic component.

In order to solve the above problems, a lamp of the present disclosure includes: a power supply circuit provided on a first substrate and configured to generate a predetermined voltage based on a power supply voltage: a light source that is provided on a second substrate, includes a plurality of light-emitting elements and an adjustment unit configured to adjust a drive current flowing through each of the plurality of light-emitting elements, and uses the predetermined voltage as a power supply: a control unit provided on a third substrate and configured to control the adjustment unit; a first temperature detection circuit provided on the first substrate and configured to detect a temperature: and a second temperature detection circuit provided on the second substrate and configured to detect a temperature. The control unit is configured to control the adjustment unit based on a detection result having a higher temperature of detection results of the first and second temperature detection circuits and a signal indicating a turn-on condition of the plurality of light-emitting elements.

In addition, in order to solve the above problems, a lamp of the present disclosure includes: a power supply circuit configured to generate a predetermined voltage based on a power supply voltage: a light source that includes a plurality of light-emitting elements and an adjustment unit configured to adjust a drive current flowing through each of the plurality of light-emitting elements, and uses the predetermined voltage as a power supply: a temperature detection circuit provided on a substrate on which the power supply circuit is disposed and configured to detect a temperature; and a control unit configured to control the adjustment unit based on a first signal from the temperature detection circuit and a second signal indicating a turn-on condition of the plurality of light-emitting elements.

According to the present disclosure, it is possible to provide a lamp capable of preventing heat generation and preventing destroy of an electronic component.

DESCRIPTION OF EMBODIMENTS

At least the following matters will be clear based on the description of the present specification and accompanying drawings.

First Embodiment

Figure 1:
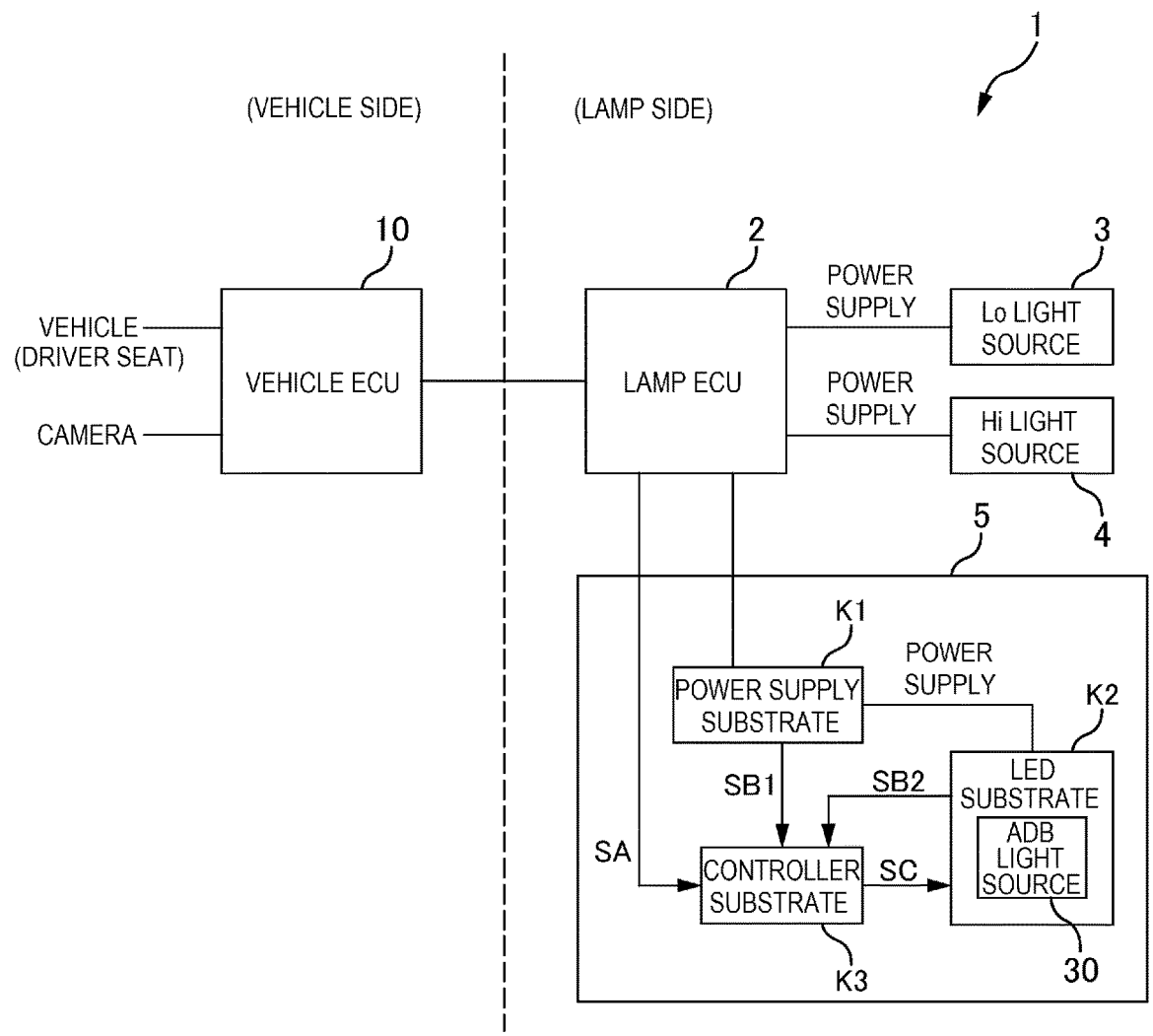
FIG. 1 is a block diagram showing an example of a system configuration including a vehicle lamp 1 of a first embodiment.

A system shown in FIG. 1 includes a vehicle electronic control unit (ECU) 10 provided on a vehicle side and a vehicle lamp 1 on a lamp side.

The vehicle ECU 10 is connected to a lamp ECU 2 of the vehicle lamp 1 on the lamp side via a control line such as a controller area network (CAN), and integrally controls the vehicle lamp 1. The vehicle ECU 10 of the present embodiment receives vehicle information from a driver seat or the like of a vehicle and camera information from an in-vehicle camera, and transmits a signal for controlling the vehicle lamp 1 to the lamp ECU 2 based on the information.

The vehicle lamp 1 is, for example, a front lamp (headlamp) provided at a front end portion of the vehicle, and corresponds to a "lamp". The vehicle lamp 1 is provided on each of a right side and a left side of the vehicle, but configurations of both the left and right sides are the same, and thus a configuration of only one side (for example, the right side) is shown in FIG. 1. The vehicle lamp 1 of the present embodiment includes the lamp ECU 2, a Lo light source 3, a Hi light source 4, and an ADB unit 5.

The lamp ECU 2 is a device that controls turn-on of each light source of the vehicle lamp 1. The lamp ECU 2 receives the signal including the vehicle information, the camera information, and the like from the vehicle ECU 10. Based on the signal, the lamp ECU 2 appropriately turns on the Lo light source 3, the Hi light source 4, and an ADB light source 30 (to be described later) of the ADB unit 5. The lamp ECU 2 transmits a signal SA indicating a turn-on condition (light distribution pattern or the like) of the ADB light source 30 to a control circuit 40 (to be described later) of the ADB unit 5.

A power supply line with a power supply voltage Vbat from a vehicle battery (battery 6 shown in FIG. 2) and a ground line with a ground level voltage are connected to the lamp ECU 2. The lamp ECU 2 supplies power to the Lo light source 3, the Hi light source 4, and the ADB unit 5.

The Lo light source 3 is a low-beam light source. A low beam illuminates the vicinity of an own vehicle at a predetermined illuminance, has a determined light distribution regulation so as not to give glare to oncoming vehicles and preceding vehicles, and is mainly used when running in an urban area.

The Hi light source 4 is a high-beam light source. A high beam illuminates a front wide and distant range with a relatively high illuminance, and is mainly used when running at a high speed on a road where there are few oncoming vehicles or preceding vehicles.

The ADB unit 5 is a unit constituting a variable light distribution headlamp (adaptive driving beam (ADB)) that variably controls light distribution of the light distribution pattern. The ADB detects presence or absence of a preceding vehicle, an oncoming vehicle, or a pedestrian in front of a vehicle by an in-vehicle camera, and dims light on a region corresponding to the vehicle or the pedestrian, thereby reducing glare given to the vehicle or the pedestrian.

Configuration of ADB Unit 5

Figure 2:
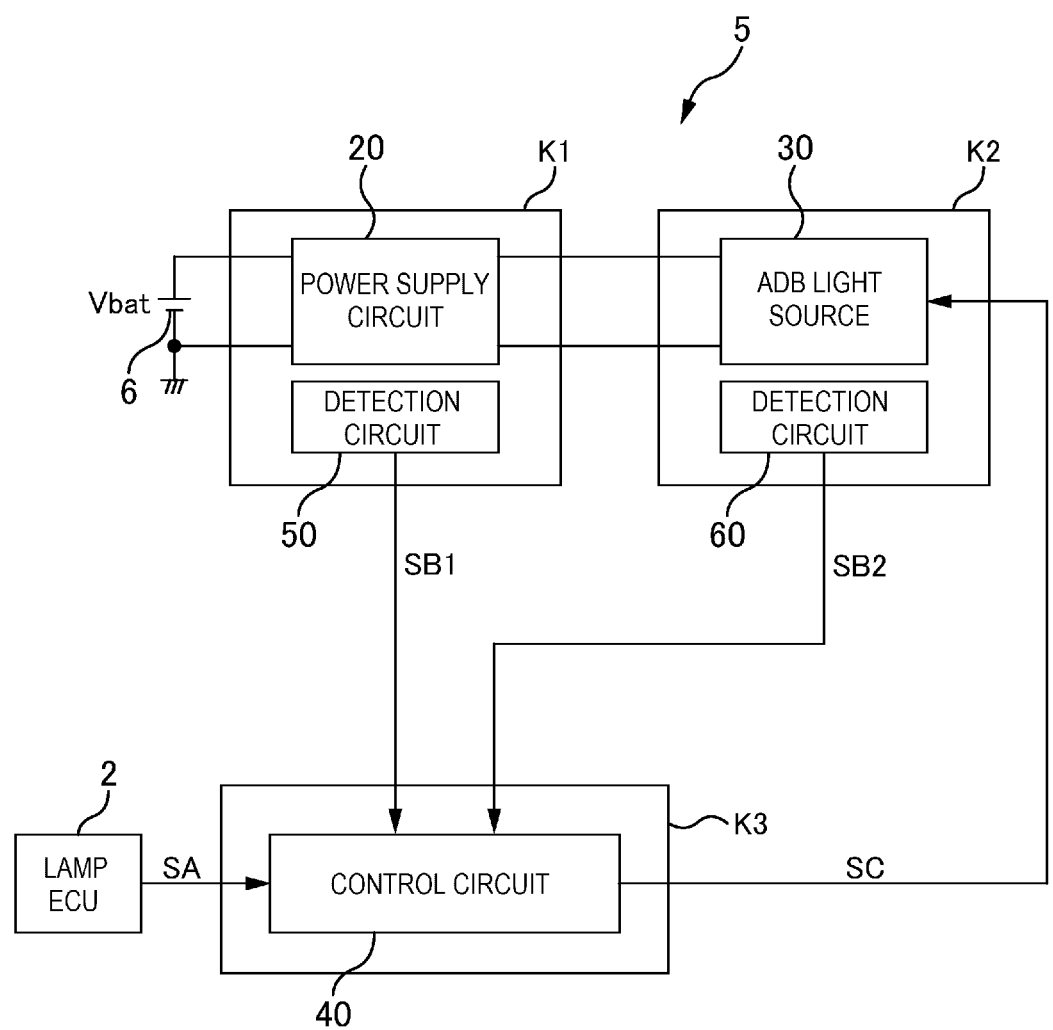
FIG. 2 is a block diagram showing a configuration of an ADB unit 5 in the first embodiment.
Figure 3:
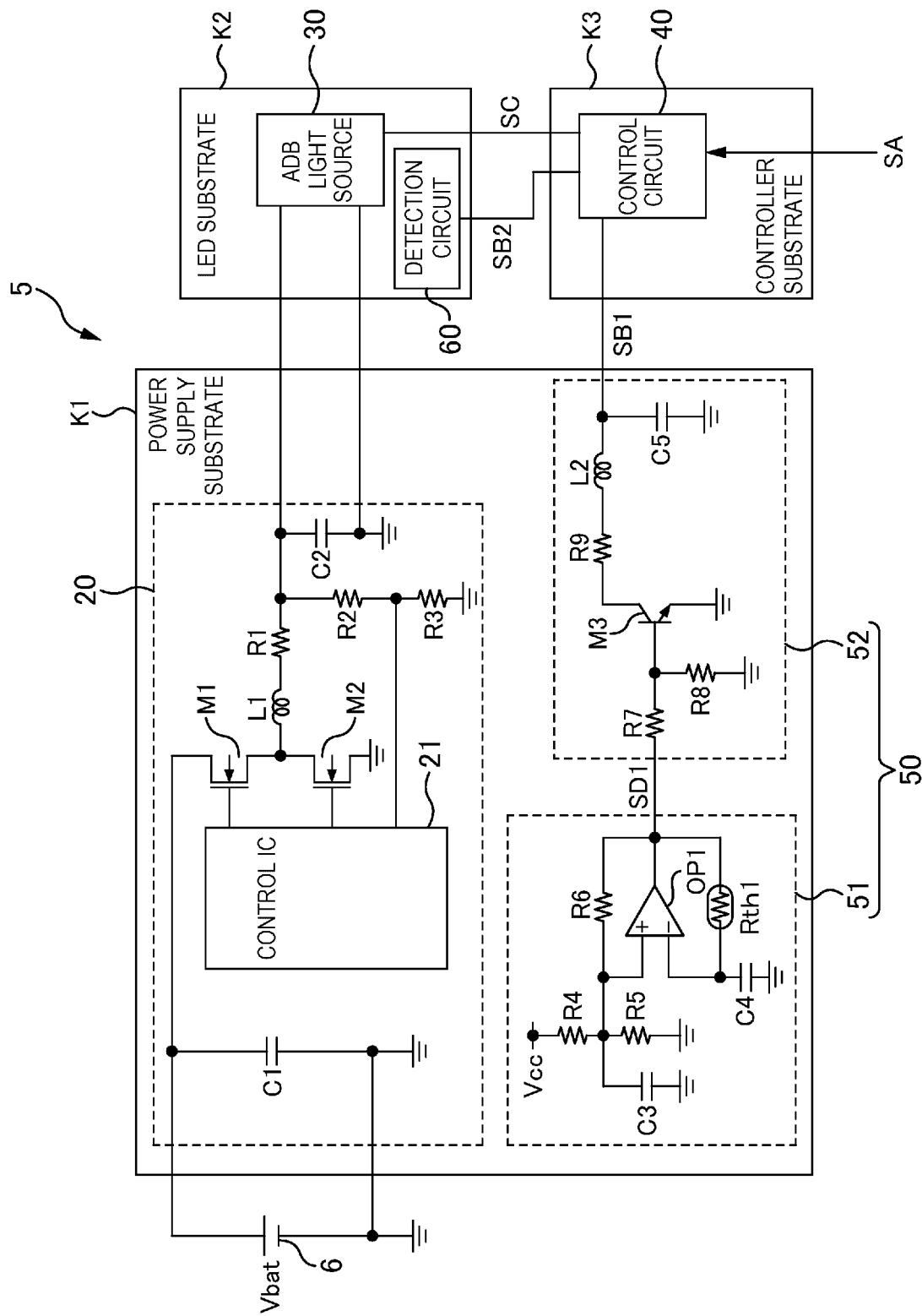
FIG. 3 is a diagram showing a configuration example of circuits arranged on a power supply substrate K1 shown in FIG. 2.
Figure 4:
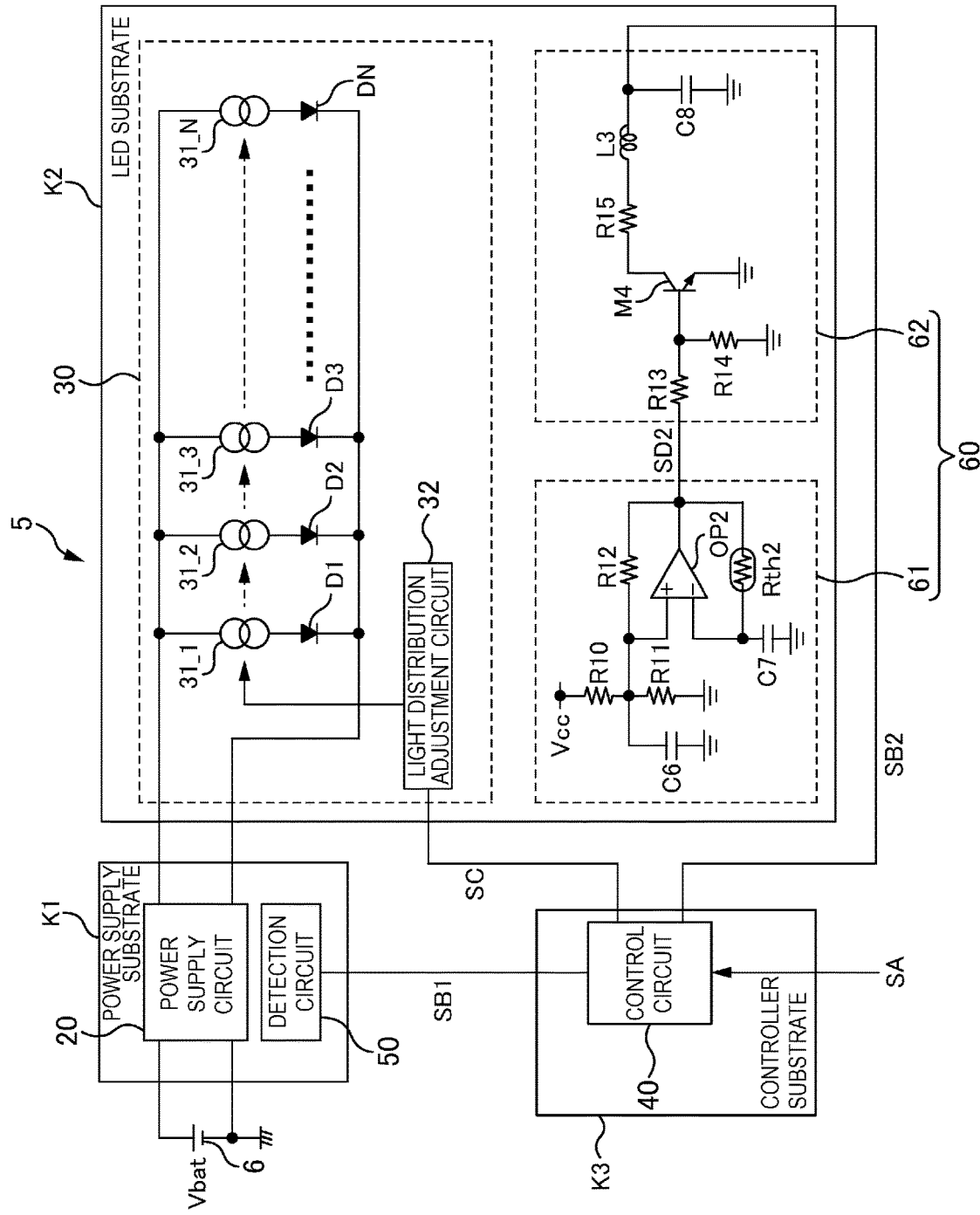
FIG. 4 is a diagram showing a configuration example of circuits arranged on an LED substrate K2 shown in FIG. 2.

FIG. 2 is a block diagram showing a configuration of the ADB unit 5 in the first embodiment. FIG. 3 is a diagram showing a configuration example of circuits arranged on a power supply substrate K1 shown in FIG. 2, and FIG. 4 is a diagram showing a configuration example of circuits arranged on an LED substrate K2 shown in FIG. 2.

As shown in FIGS. 1 to 4, the ADB unit 5 of the present embodiment includes the power supply substrate K1, the LED substrate K2, and a controller substrate K3. A power supply circuit 20 and a detection circuit 50 are arranged on the power supply substrate K1, the ADB light source 30 and a detection circuit 60 are arranged on the LED substrate K2, and the control circuit 40 is disposed on the controller substrate K3. The power supply substrate K1 corresponds to a "first substrate", the LED substrate K2 corresponds to a "second substrate", and the controller substrate K3 corresponds to a "third substrate". The substrates are connected by signal lines such as harnesses.

Power Supply Circuit 20

The power supply circuit 20 is a voltage regulator that generates a predetermined voltage (for example, 5 V) based on the power supply voltage Vbat (for example, 12 V) supplied from the battery 6 of the vehicle. The power supply circuit 20 of the present embodiment is a step-down DC-DC converter (for example, a switching regulator). However, the present invention is not limited thereto, and for example, a linear regulator may be used, or a configuration including a step-up circuit and a step-down circuit (configuration of stepping down after stepping up) may be used.

The power supply circuit 20 is a so-called synchronous rectification type circuit, and includes capacitors C1 and C2, transistors M1 and M2, a coil L1, resistors R1, R2, and R3, and a control IC 21 as shown in FIG. 3.

The capacitor C1 is a capacitor on an input side, and has one end connected to the power supply line and the other end connected to the ground line (grounded).

Each of the transistors M1 and M2 is an NMOSFET. A drain of the transistor M1 is connected to one end of the capacitor C1, and a source of the transistor M1 is connected to a drain of the transistor M2 and one end of the coil L1. A source of the transistor M2 is grounded. Gates of the transistors M1 and M2 are connected to the control IC 21, and the transistors M1 and M2 are controlled to be turned on and off by the control IC 21.

The other end of the coil LI is connected to one end of the capacitor C2 on an output side via the resistor R1. The other end of the capacitor C2 is grounded. A voltage generated at both ends of the capacitor C2 is an output voltage.

The resistor R2 and the resistor R3 are connected in series between the ground and a connection point of the resistor R1 and the one end of the capacitor C2. A voltage at a connection point between the resistor R2 and the resistor R3 (voltage obtained by dividing the output voltage by the resistor R2 and the resistor R3) is transmitted to the control IC 21.

The control IC 21 switches the transistors M1 and M2 based on the voltage generated at the connection point between the resistor R2 and the resistor R3 such that the output voltage of the power supply circuit 20 is the predetermined voltage.

When the transistor M1 is turned on and the transistor M2 is turned off, an input voltage (voltage of the capacitor C1) is applied to the one end of the coil L1. When the transistor M1 is turned off, and the transistor M2 is turned on, a voltage of the ground line (ground voltage) is applied to the one end of the coil L1.

By repeating the above operation, the output voltage of the power supply circuit 20 is smaller than the input voltage (power supply voltage Vbat) and is controlled to be the predetermined voltage (for example, 5 V).

ADB Light Source 30

The ADB light source 30 is a light source using the output voltage (predetermined voltage) of the power supply circuit 20 as a power supply, and corresponds to a "light source".

As shown in FIG. 4, the ADB light source 30 includes a plurality of (N) light-emitting elements D1 to DN, a plurality of (N) current sources 31_1 to 31_N, and a light distribution adjustment circuit 32.

The plurality of light-emitting elements D1 to DN and the plurality of current sources 31_1 to 31_N are respectively connected in series between the power supply line and the ground line. That is, in the ADB light source 30, a plurality of combinations of the light-emitting elements and the current sources connected in series are arranged in parallel (connected in parallel).

The light-emitting elements D1 to DN are elements that are turned on by being supplied with a drive current, and in the present embodiment, LEDs (light-emitting diodes) are used. The plurality of light-emitting elements D1 to DN are connected in parallel, and are arranged side by side in, for example, an array form in order to form a light distribution pattern.

Each of the current sources 31_1 to 31_N supplies the drive current to the corresponding light-emitting element based on the output voltage of the power supply circuit 20.

The light distribution adjustment circuit 32 controls the current sources 31_1 to 31_N according to an instruction of the control circuit 40 (signal SC input from the control circuit 40) to adjust the drive current flowing through the plurality of light-emitting elements D1 to DN. Accordingly, it is possible to turn on lights with a light distribution pattern according to a situation of the vehicle. The light distribution adjustment circuit 32 corresponds to an "adjustment unit".

A method of adjusting the drive current by the light distribution adjustment circuit 32 is not particularly limited, and for example, PWM control or analog control can be applied. In the present embodiment, the current sources 31_1 to 31_N are constituted by a current mirror circuit, and a magnitude of the drive current flowing through one light-emitting element is adjusted, so that a magnitude of the drive current flowing through the other light-emitting elements is also changed accordingly.

Control Circuit 40

Based on the signal SA from the lamp ECU 2 (and signals SB1 and SB2 from the detection circuits 50 and 60 to be described later), the control circuit 40 generates the signal SC that collectively instructs the plurality of light-emitting elements D1 to DN to turn-on or turn-off, a luminance pattern, and the like, and outputs the signal SC to the light distribution adjustment circuit 32 of the ADB light source 30. Accordingly, the control circuit 40 controls the light distribution adjustment circuit 32 to turn on each of the plurality of light-emitting elements D1 to DN at a desired brightness. The control circuit 40 corresponds to a "control unit".

As described above, in the ADB light source 30 of the present embodiment, the plurality of light-emitting elements D1 to DN are connected in parallel. In this case, a larger current is required as the number of light-emitting elements to be turned on is larger. For example, when the number of light-emitting elements is 1000 and a current required for turning on one light-emitting element is 10 mA, a total current supply capacity of 10 A (=10 mA×1000) is required. Therefore, heat generation in the power supply circuit 20 that supplies power or the ADB light source 30 is large, and electronic components may be thermally destroyed.

Therefore, in the ADB unit 5 of the present embodiment, the detection circuit 50 capable of detecting a temperature is provided in the power supply substrate K1 on which the power supply circuit 20 is disposed, and the detection circuit 60 capable of detecting a temperature is provided in the LED substrate K2 on which the ADB light source 30 is disposed. Based on one (one having a higher temperature) of a detection result of the detection circuit 50 and a detection result of the detection circuit 60, and the signal SA indicating the turn-on condition from the lamp ECU 2, temperature derating is performed to reduce power consumption as the temperature increases.

Detection Circuit 50

The detection circuit 50 is provided on the power supply substrate K1 on which the power supply circuit 20 is disposed, and includes a temperature detection circuit 51 and an interface circuit (hereinafter, I/F circuit) 52.

The temperature detection circuit 51 is a circuit that is provided on the power supply substrate K1 and detects a temperature. The temperature detection circuit 51 corresponds to a "first temperature detection circuit". The temperature detection circuit 51 of the present embodiment includes an oscillation circuit that outputs a signal SD1 having a frequency corresponding to the temperature. As shown in FIG. 3, the temperature detection circuit 51 includes resistors R4 to R6, capacitors C3 and C4, a thermistor Rth1, and an operational amplifier OP1.

The resistor R4 and the resistor R5 are connected in series, a voltage Vcc is applied to one end (one end of the resistor R4), and the other end (the other end of the resistor R5) is grounded.

One end of the capacitor C3 is connected to a connection point between the resistor R4 and the resistor R5 connected in series, and the other end is grounded.

An inverting input terminal (−terminal) of the operational amplifier OP1 is grounded via the capacitor C4 and is connected to an output of the operational amplifier OP1 via the thermistor Rth1. The thermistor Rth1 is an electronic component whose resistance value changes according to a change in temperature (see FIG. 5).

A non-inverting input terminal (+terminal) of the operational amplifier OP1 is connected to the connection point between the resistor R4 and the resistor R5 and is connected to the output of the operational amplifier OP1 via the resistor R6.

The temperature detection circuit 51 is obtained by replacing a part of the resistor (resistor connected between the −terminal and the output) with the thermistor Rth1 in the oscillation circuit using the operational amplifier OP1. As a resistance value of the thermistor Rth1 changes according to a temperature, a frequency of an output signal (signal SD1) changes. As the temperature detection circuit 51, it is sufficient to output a signal SD having a frequency corresponding to the resistance value of the thermistor Rth1, and thus for example, a Hartley oscillation circuit or a Wien bridge oscillation circuit may be used.

The I/F circuit 52 is a circuit that converts an output signal (signal SD1) of the temperature detection circuit 51 into a signal (signal SB1) of logic level. The signal of logic level is a rectangular wave signal that switches between a high level (hereinafter, referred to as an H level) and a low level (hereinafter, referred to as an L level). The I/F circuit 52 corresponds to a "first interface circuit".

The I/F circuit 52 includes a transistor M3, resistors R7 to R9, a coil L2, and a capacitor C5. The coil L2 and the capacitor C5 are connected to a pull-up resistor (not shown) inside the control circuit 40.

The transistor M3 is an NPN transistor, and has an emitter grounded and a collector connected to one end of the coil L2 via the resistor R9. The power is supplied from, for example, the control circuit 40 to the collector of the NPN transistor M3. A base of the NPN transistor M3 is connected to a connection point between the resistor R7 and the resistor R8 connected in series between an output of the temperature detection circuit 51 (output of the operational amplifier OP1) and the ground. That is, a voltage obtained by dividing the output (signal SD1) of the temperature detection circuit 51 by the resistor R7 and the resistor R8 is applied to the base of the NPN transistor M3.

One end of the capacitor C5 is connected to the other end of the coil L2, and the other end of the capacitor C5 is grounded. The coil L2 and the capacitor C5 constitute a noise removing filter. A voltage between both ends of the capacitor C5 is an output of the detection circuit 50.

With the above configuration, when the NPN transistor M3 is turned on, an L-level signal is output, and when the NPN transistor M3 is turned off, an H-level signal is output. Accordingly, an output (signal SB1) of the I/F circuit 52 is a rectangular wave signal (signal of logic level) indicating temperature information based on the signal SD1. Accordingly, even when the signal SB1 is transmitted to the control circuit 40 of the controller substrate K3 via the harness, it is possible to reduce an influence of noise (increase noise resistance) because the signal SB1 is a rectangular wave signal.

Detection Circuit 60

The detection circuit 60 is provided on the LED substrate K2 on which the ADB light source 30 is disposed, and includes a temperature detection circuit 61 and an I/F circuit 62.

The temperature detection circuit 61 is a circuit that is provided on the LED substrate K2 and detects a temperature. The temperature detection circuit 61 corresponds to a "second temperature detection circuit". The temperature detection circuit 61 of the present embodiment includes an oscillation circuit that outputs a signal SD2 having a frequency corresponding to the temperature. As shown in FIG. 4, the temperature detection circuit 61 includes resistors R10 to R12, capacitors C6 and C7, a thermistor Rth2, and an operational amplifier OP2. A configuration of the temperature detection circuit 61 is the same as that of the temperature detection circuit 51, and thus the description thereof is omitted.

The I/F circuit 62 is a circuit that converts an output signal (signal SD2) of the temperature detection circuit 61 into a signal of logic level (signal SB2). The I/F circuit 62 corresponds to a "second interface circuit". The I/F circuit 62 includes a transistor M4, resistors R13 to R15, a coil L3, and a capacitor C8. The coil L3 and the capacitor C8 are connected to the pull-up resistor (not shown) inside the control circuit 40. A configuration of the I/F circuit 62 is the same as that of the I/F circuit 52, and thus the description thereof is omitted.

About Temperature Derating

The control circuit 40 performs the temperature derating based on one of the detection result of the detection circuit 50 (in other words, the temperature detection circuit 51) and the detection result of the detection circuit 60 (in other words, the temperature detection circuit 61), and the signal SA indicating the light distribution pattern (turn-on condition) from the lamp ECU 2.

Figure 5:
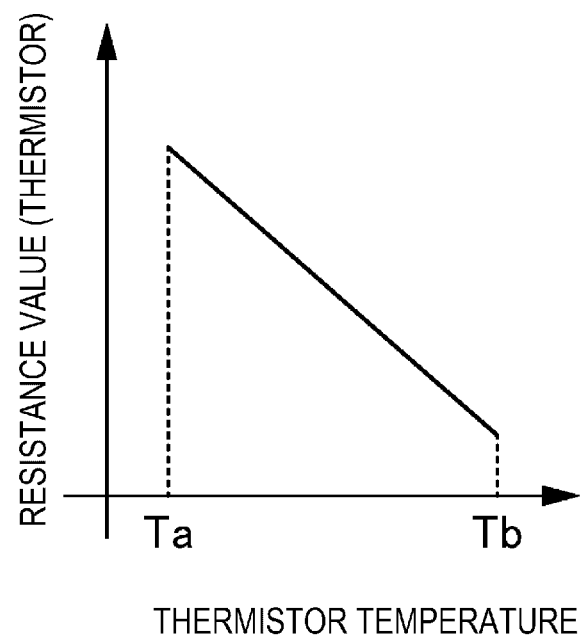
FIG. 5 is a diagram illustrating a relationship between temperature information and temperature derating in the first embodiment.
Figure 6:
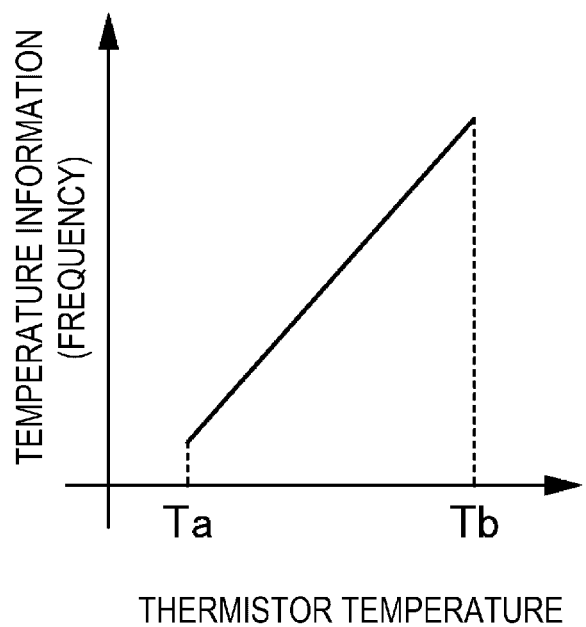
FIG. 6 is a diagram illustrating the relationship between the temperature information and the temperature derating in the first embodiment.
Figure 7:
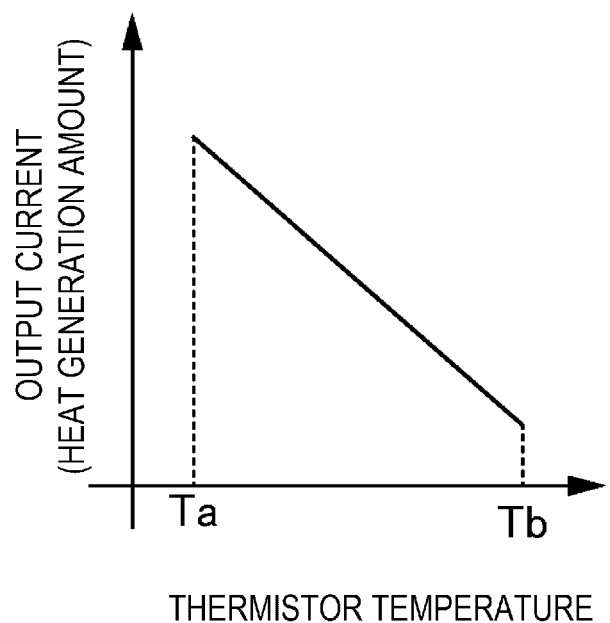
FIG. 7 is a diagram illustrating the relationship between the temperature information and the temperature derating in the first embodiment.

FIGS. 5 to 7 are diagrams illustrating a relationship between temperature information and the temperature derating in the first embodiment. Here, the temperature information of the temperature detection circuit 51 (thermistor Rth1) will be described, but the same applies to the temperature detection circuit 61 (thermistor Rth2). A horizontal axis in FIGS. 5 to 7 indicates a temperature of the thermistor Rth1. A vertical axis in FIG. 5 indicates a resistance value of the thermistor Rth1, a vertical axis in FIG. 6 indicates the temperature information (frequency of oscillation of the signal SD1) of the temperature detection circuit 51, and a vertical axis in FIG. 7 indicates a magnitude of an output current (drive current flowing through the light-emitting element) of the ADB light source 30.

As shown in FIG. 5, the resistance value of the thermistor Rth1 decreases as the temperature increases. Accordingly, as shown in FIG. 6, the frequency of oscillation of the signal SD1 (signal SB1) increases as the temperature increases. Similarly, in the temperature detection circuit 61, a frequency of oscillation of the signal SD2 (signal SB2) increases as the temperature increases.

The control circuit 40 selects one having a higher frequency (in other words, one having a higher temperature) of the signal SB1 received from the detection circuit 50 and the signal SB2 received from the detection circuit 60. The temperature derating is performed as shown in FIG. 7 based on the detection result having a higher temperature and the signal SA indicating the turn-on condition. That is, the light distribution adjustment circuit 32 is controlled by generating the signal SC that reduces the power consumption (drive current flowing through the light-emitting element) in accordance with an increase in frequency (increase in temperature).

In the present embodiment, the control circuit 40 controls the light distribution adjustment circuit 32 such that the drive current flowing through each of the light-emitting elements D1 to DN decreases without changing the number of light-emitting elements to be turned on among the light-emitting elements D1 to DN when the temperature derating is performed. Accordingly, the power consumption can be reduced (heat generation can be prevented) without affecting the light distribution pattern. However, the present invention is not limited thereto, and for example, an upper limit value of the drive current flowing through each light-emitting element may be lowered, or the light distribution pattern may be changed. Accordingly, it is possible to efficiently prevent the heat generation in the power supply substrate K1 and the LED substrate K2, and it is possible to prevent the electronic components from being destroyed.

A range of the temperature information (frequency) for performing the temperature derating (range corresponding to temperatures Ta to Tb) is designed in accordance with a specification of the control circuit 40 on an information receiving side. When the temperature range is wide and an oscillation operation is unstable, a temperature detection circuit (not shown) serving as a trigger may be provided on each of the power supply substrate K1 and the LED substrate K2 separately from the oscillation circuit, and the temperature derating may be performed or stopped based on an output of the circuit.

Second Embodiment

In a second embodiment, a configuration of the ADB unit is different from that of the first embodiment.

Figure 8:
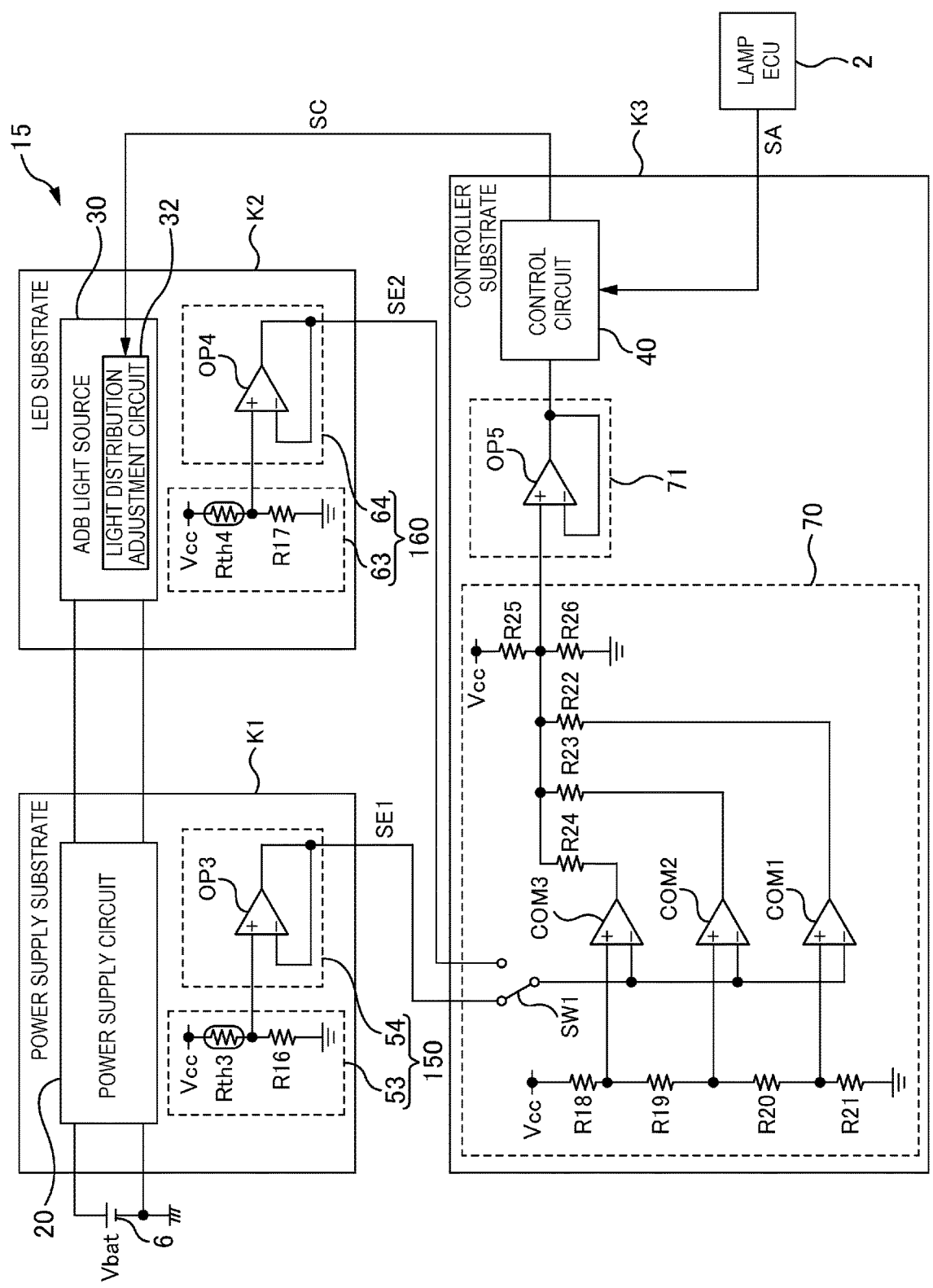
FIG. 8 is a diagram showing a configuration of an ADB unit 15 of a second embodiment.

FIG. 8 is a diagram showing the configuration of the ADB unit 15 of the second embodiment. In FIG. 8, parts having the same configuration as those in the first embodiment are denoted by the same reference numerals, and the description thereof is omitted.

In the second embodiment, the power supply circuit 20 and a detection circuit 150 are arranged on the power supply substrate K1, the ADB light source 30 and a detection circuit 160 are arranged on the LED substrate K2, and the control circuit 40 and a voltage conversion circuit 70 (and a buffer circuit 71) are arranged on the controller substrate K3.

The detection circuit 150 is provided on the power supply substrate K1 and includes a temperature detection circuit 53 for detecting a temperature and a buffer circuit 54.

The temperature detection circuit 53 includes a resistor R16 and a thermistor Rth3. The resistor R16 and the thermistor Rth3 are connected in series, the voltage Vcc is applied to one end (end of the thermistor Rth3), and the other end (end of the resistor R16) is grounded. In the second embodiment, the temperature detection circuit 53 corresponds to a "first temperature detection circuit".

The buffer circuit 54 is a circuit that prevents an output voltage from fluctuating according to an input impedance, and includes an operational amplifier OP3 (voltage follower) whose output is negatively fed back. An output voltage of the temperature detection circuit 53 (voltage of a connection node between the resistor R16 and the thermistor Rth3) is applied to a +terminal of the operational amplifier OP3, and the output of the operational amplifier OP3 is transmitted to the controller substrate K3 as a signal SE1.

The detection circuit 160 is provided on the LED substrate K2 and includes a temperature detection circuit 63 for detecting a temperature and a buffer circuit 64.

The temperature detection circuit 63 includes a resistor R17 and a thermistor Rth4. The temperature detection circuit 63 has the same configuration as that of the temperature detection circuit 53, and thus the description thereof is omitted. In the second embodiment, the temperature detection circuit 63 corresponds to a "second temperature detection circuit".

The buffer circuit 64 is a circuit having the same function as the buffer circuit 54, and includes an operational amplifier OP4 (voltage follower) whose output is negatively fed back. An output voltage of the temperature detection circuit 63 (voltage of a connection node between the resistor R17 and the thermistor Rth4) is applied to a +terminal of the operational amplifier OP4, and the output of the operational amplifier OP4 is transmitted to the controller substrate K3 as a signal SE2.

The voltage conversion circuit 70 is a circuit that converts a detection result of each of the temperature detection circuit 53 and the temperature detection circuit 63 into a stepwise voltage waveform (see FIG. 11), and includes resistors R18 to R26, comparators COM1 to COM3, and a switch SW1.

The resistors R18 to R21 are connected in series, the voltage Vcc is applied to one end (end of the resistor R18), and the other end (end of the resistor R21) is grounded.

The resistor R25 and the resistor R26 are connected in series, and the voltage Vcc is applied to one end (end of the resistor R25), and the other end (end of the resistor R26) is grounded.

The switch SW1 is a switch for switching an input to an inverting input terminal (−terminal) of each of the comparators COM1 to COM3 to a detection result (signal SE1) of the detection circuit 150 or a detection result (signal SE2) of the detection circuit 160. In the present embodiment, the switch SW1 is automatically switched by using a timer or the like every predetermined time (for example, one minute). However, the present invention is not limited thereto, and for example, the control circuit 40 may select a temperature detection target (switch the switch SW1).

A voltage at a connection point between the resistor R20 and the resistor R21 is applied to a non-inverting input terminal (+terminal) of the comparator COM1. An output of the comparator COM1 is connected to a connection point between the resistor R25 and the resistor R26 via the resistor R22.

A voltage at a connection point between the resistor R19 and the resistor R20 is applied to a +terminal of the comparator COM2. An output of the comparator COM2 is connected to the connection point between the resistor R25 and the resistor R26 via the resistor R23.

A voltage at a connection point between the resistor R18 and the resistor R19 is applied to a +terminal of the comparator COM3. An output of the comparator COM3 is connected to the connection point between the resistor R25 and the resistor R26 via the resistor R24.

Each of the comparators COM1, COM2, and COM3 is an open drain comparator, and outputs an open (high impedance) voltage when a voltage of the +terminal is larger than a voltage of the −terminal, and outputs an L level (ground level) voltage when the voltage of the +terminal is smaller than the voltage of the −terminal.

The buffer circuit 71 is a circuit having the same function as the buffer circuits 54 and 64, and includes an operational amplifier OP5 (voltage follower) whose output is negatively fed back. An output voltage (voltage of a connection node between the resistor R25 and the resistor R26) of the voltage conversion circuit 70 is applied to a +terminal of the operational amplifier OP5. An output of the voltage conversion circuit 70 is input to the control circuit 40 via the buffer circuit 71 (operational amplifier OP5).

Next, a temperature derating operation of the second embodiment will be described.

FIGS. 9 to 12 are diagrams showing a relationship between temperature information and temperature derating in the second embodiment. Here, a case where the detection result (signal SE1) of the detection circuit 150 is selected in the switch SW1 will be described, but the same applies to a case where the detection result (signal SE2) of the detection circuit 160 is selected. A horizontal axis in FIGS. 9 to 12 indicates a temperature of the thermistor Rth3. A vertical axis in FIG. 9 indicates a resistance value of the thermistor Rth3, and a vertical axis in FIG. 10 indicates a magnitude of an input of the −terminal of each of the comparators (comparators COM1, COM2, and COM3). A vertical axis in FIG. 11 indicates an output voltage (temperature information) of the voltage conversion circuit 70, and a vertical axis in FIG. 12 indicates a magnitude of an output current (drive current flowing through each light-emitting element) of the ADB light source 30.

Figure 9:
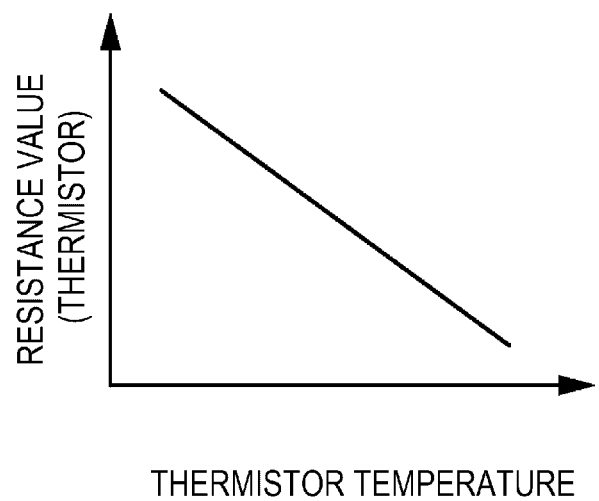
FIG. 9 is a diagram illustrating a relationship between temperature information and temperature derating in the second embodiment.
Figure 10:
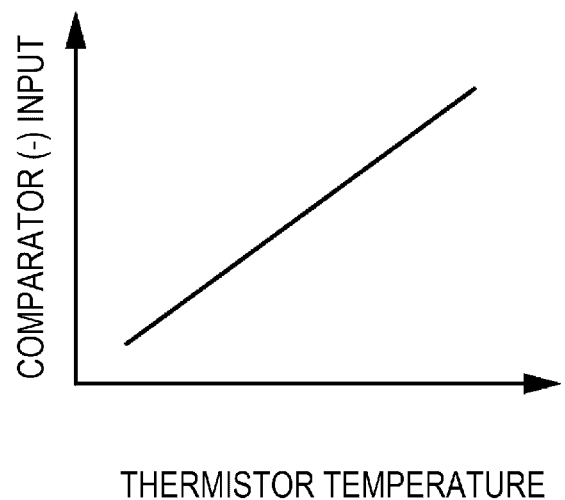
FIG. 10 is a diagram illustrating the relationship between the temperature information and the temperature derating in the second embodiment.

As shown in FIG. 9, the resistance value of the thermistor Rth3 decreases as the temperature increases. Accordingly, the voltage at the connection node between the thermistor Rth3 and the resistor R16 increases as the temperature increases. That is, as shown in FIG. 10, an input voltage of the −terminal of each of the comparators (comparators COM1, COM2, and COM3) increases as the temperature increases.

Figure 11:
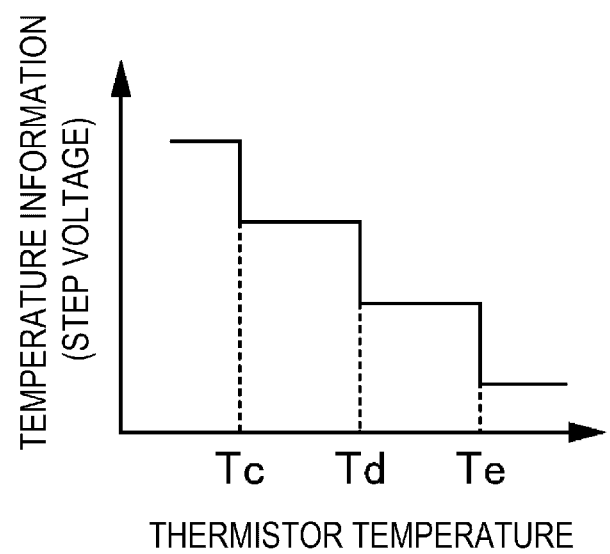
FIG. 11 is a diagram illustrating the relationship between the temperature information and the temperature derating in the second embodiment.

When a temperature is equal to or lower than a temperature Tc shown in FIG. 11, the comparators COM1, COM2, and COM3 are opened. Therefore, a voltage obtained by dividing the voltage Vcc by the resistor R25 and the resistor R26 is output from the voltage conversion circuit 70.

When a temperature exceeds the temperature Tc, the voltage of the −terminal of the comparator COM1 is larger than the voltage of the +terminal, and the output of the comparator COM1 is at the L level (ground level). Accordingly, the resistor R22 is grounded, and thus as shown in FIG. 11, the output voltage (temperature information) of the voltage conversion circuit 70 decreases as compared with when the temperature is equal to or lower than the temperature Tc.

When a temperature exceeds a temperature Td (>Tc), the voltage of the −terminal of the comparator COM2 is larger than the voltage of the +terminal, and the output of the comparator COM2 is at the L level (ground level). Accordingly, the resistor R23 is grounded, and thus as shown in FIG. 11, the output voltage of the voltage conversion circuit 70 still decreases.

Further, when a temperature exceeds a temperature Te (>Td), the voltage of the −terminal of the comparator COM3 is larger than the voltage of the +terminal, and the output of the comparator COM3 is at the L level (ground level). Accordingly, the resistor R24 is grounded, and thus as shown in FIG. 11, the output voltage of the voltage conversion circuit 70 further decreases.

In this way, the voltage conversion circuit 70 converts a voltage (analog voltage) proportional to the temperature shown in FIG. 7 into a stepwise voltage as shown in FIG. 11.

When the switch SW1 is switched at a predetermined timing, the control circuit 40 receives temperature information obtained by converting the detection result of the detection circuit 150 (temperature detection circuit 53) by the voltage conversion circuit 70 and temperature information obtained by converting the detection result of the detection circuit 160 (temperature detection circuit 63) by the voltage conversion circuit 70.

Then, the control circuit 40 controls the light distribution adjustment circuit 32 based on the signal SA and one having a higher temperature in the temperature information (detection result).

Figure 12:
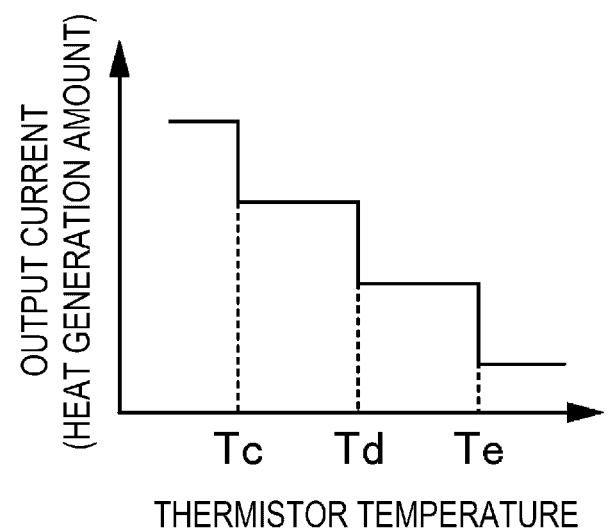
FIG. 12 is a diagram illustrating the relationship between the temperature information and the temperature derating in the second embodiment.

For example, in FIG. 12, the temperature derating is not performed when a temperature is equal to or lower than the temperature Tc. That is, the control circuit 40 turns on the plurality of light-emitting elements D1 to DN of the ADB light source 30 based on the signal SA from the lamp ECU 2 regardless of the temperature information (detection result) when a temperature is equal to or lower than the temperature Tc.

When a temperature exceeds the temperature Tc, the control circuit 40 controls the light distribution adjustment circuit 32 such that the drive current flowing through each light-emitting element becomes smaller (for example, 80% of the drive current when a temperature is equal to or lower than the temperature Tc).

When a temperature exceeds the temperature Td, the control circuit 40 controls the light distribution adjustment circuit 32 such that the drive current flowing through each light-emitting element becomes still smaller (for example, 60% of the drive current when the temperature is equal to or lower than the temperature Tc).

When a temperature exceeds the temperature Te, the control circuit 40 controls the light distribution adjustment circuit 32 such that the drive current flowing through each light-emitting element becomes further smaller (for example, 40% of the drive current when the temperature is equal to or lower than the temperature Tc).

In this way, when a temperature exceeds the temperature Tc, the control circuit 40 controls the light distribution adjustment circuit 32 to perform the temperature derating. Accordingly, heat generation in the power supply substrate K1 and the LED substrate K2 can be prevented, and thermal destroy of electronic components can be prevented. When the temperature derating is performed, similarly to the first embodiment, the light distribution adjustment circuit 32 is controlled such that the drive current flowing through each of the light-emitting elements D1 to DN decreases without changing the number of light-emitting elements to be turned on among the light-emitting elements D1 to DN. Accordingly, power consumption can be reduced (heat generation can be prevented) without affecting a light distribution pattern.

In the present embodiment, the voltage conversion circuit 70 is disposed on the controller substrate K3, but the voltage conversion circuit 70 may be provided on each of the power supply substrate K1 and the LED substrate K2, and a stepwise voltage waveform (FIG. 11) may be transmitted to the control circuit 40 of the controller substrate K3. In this case, noise resistance can be increased. On the other hand, when the voltage conversion circuit 70 is provided on the controller substrate K3 as in the present embodiment, the detection result of the temperature detection circuit 53 and the detection result of the temperature detection circuit 63 can be used in common, and thus it is possible to reduce the number of components and save space.

Third Embodiment

System Configuration

Figure 13:
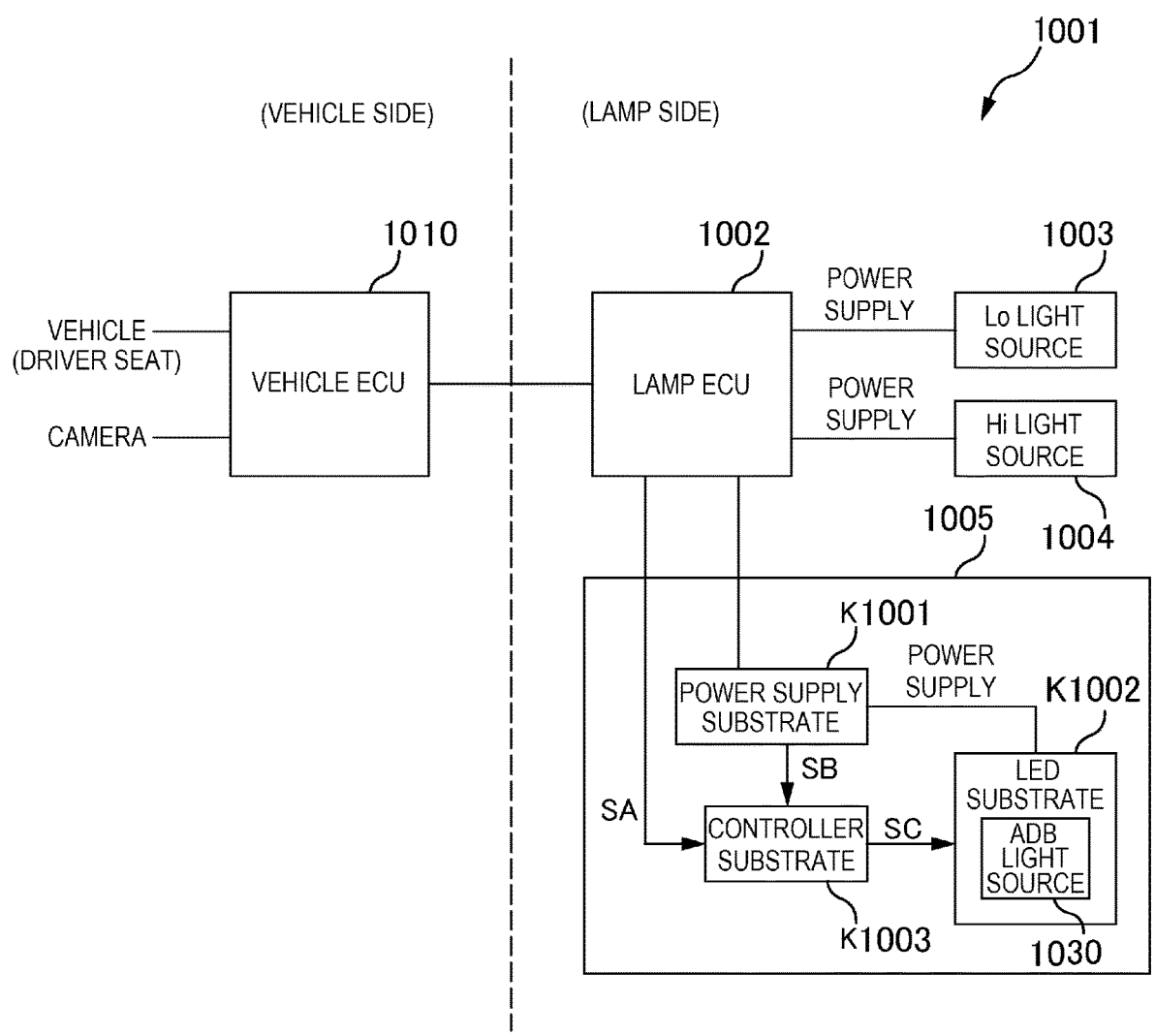
FIG. 13 is a block diagram showing an example of a system configuration including a vehicle lamp 1001 of a third embodiment.

FIG. 13 is a block diagram showing an example of a system configuration including a vehicle lamp 1001 of a third embodiment.

A system shown in FIG. 13 includes a vehicle electronic control unit (ECU) 1010 provided on a vehicle side and the vehicle lamp 1001 on a lamp side.

The vehicle ECU 1010 is connected to a lamp ECU 1002 of the vehicle lamp 1001 on the lamp side via a control line such as a controller area network (CAN), and integrally controls the vehicle lamp 1001. The vehicle ECU 1010 of the present embodiment receives vehicle information from a driver seat or the like of a vehicle and camera information from an in-vehicle camera, and transmits a signal for controlling the vehicle lamp 1001 to the lamp ECU 1002 based on the information.

The vehicle lamp 1001 is, for example, a front lamp (headlamp) provided at a front end portion of the vehicle. The vehicle lamp 1001 is provided on each of a right side and a left side of the vehicle, but configurations of both the left and right sides are the same, and thus a configuration of only one side (for example, the right side) is shown in FIG. 13. The vehicle lamp 1001 of the present embodiment includes the lamp ECU 1002, a Lo light source 1003, a Hi light source 1004, and an ADB unit 1005.

The lamp ECU 1002 is a device that controls turn-on of each light source of the vehicle lamp 1001. The lamp ECU 1002 receives the signal including the vehicle information, the camera information, and the like from the vehicle ECU 1010. Based on the signal, the lamp ECU 1002 appropriately turns on the Lo light source 1003, the Hi light source 1004, and an ADB light source 1030 (to be described later) of the ADB unit 1005. The lamp ECU 1002 transmits a signal SA indicating a turn-on condition (light distribution pattern or the like) of the ADB light source 1030 to a control circuit 1040 (to be described later) of the ADB unit 1005. The signal SA corresponds to a "second signal".

A power supply line with a power supply voltage Vbat from a vehicle battery (battery 1006 shown in FIG. 14) and a ground line with a ground level voltage are connected to the lamp ECU 1002. The lamp ECU 1002 supplies power to the Lo light source 1003, the Hi light source 1004, and the ADB unit 1005.

The Lo light source 1003 is a low-beam light source. A low beam illuminates the vicinity of an own vehicle at a predetermined illuminance, has a determined light distribution regulation so as not to give glare to oncoming vehicles and preceding vehicles, and is mainly used when running in an urban area.

The Hi light source 1004 is a high-beam light source. A high beam illuminates a front wide and distant range with a relatively high illuminance, and is mainly used when running at a high speed on a road where there are few oncoming vehicles or preceding vehicles.

The ADB unit 1005 is a unit constituting a variable light distribution headlamp (adaptive driving beam (ADB)) that variably controls light distribution of the light distribution pattern. The ADB detects presence or absence of a preceding vehicle, an oncoming vehicle, or a pedestrian in front of a vehicle by an in-vehicle camera, and dims light on a region corresponding to the vehicle or the pedestrian, thereby reducing glare given to the vehicle or the pedestrian.

Configuration of ADB Unit 1005

Figure 14:
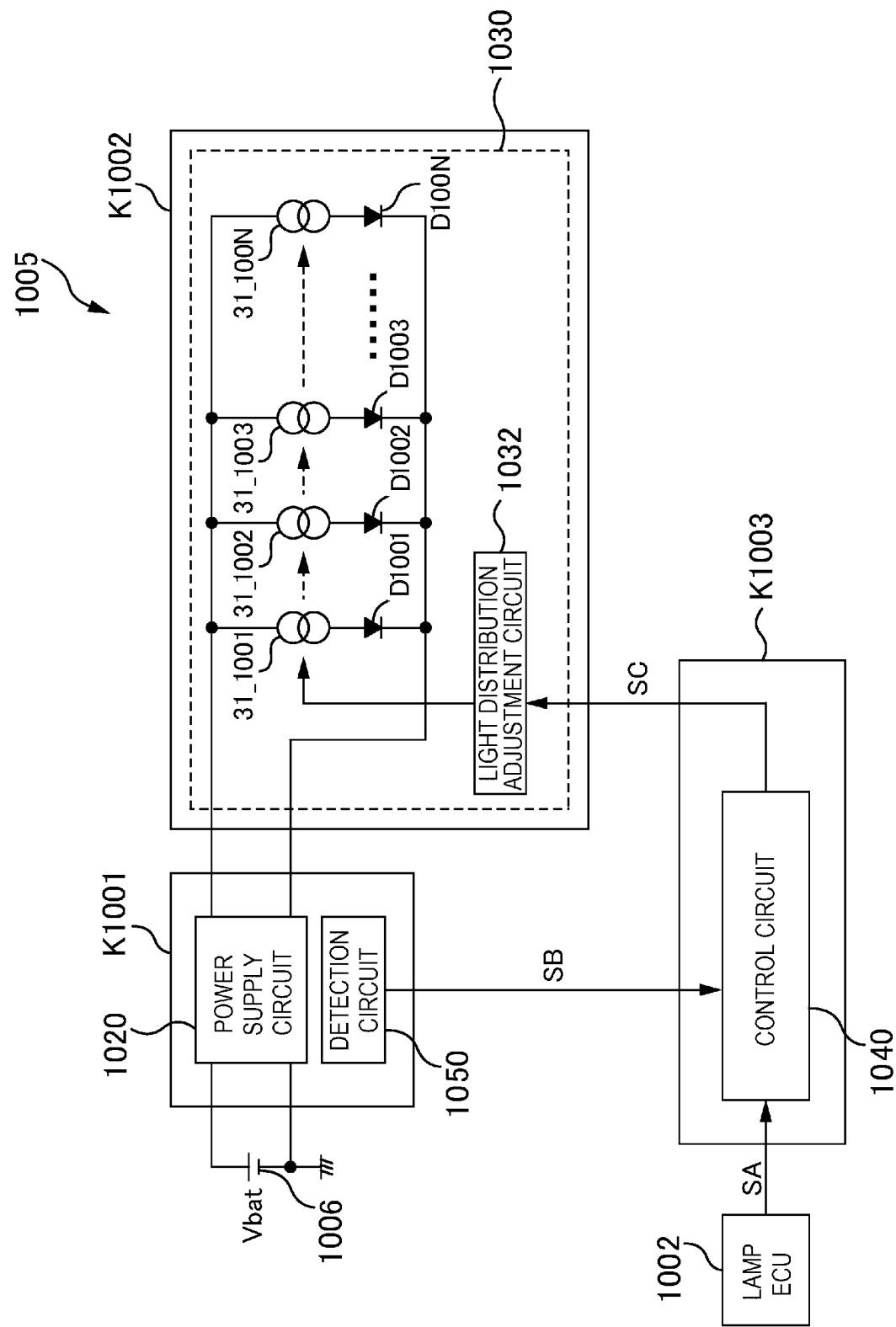
FIG. 14 is a diagram showing a configuration example of an ADB unit 1005 in the third embodiment.
Figure 15:
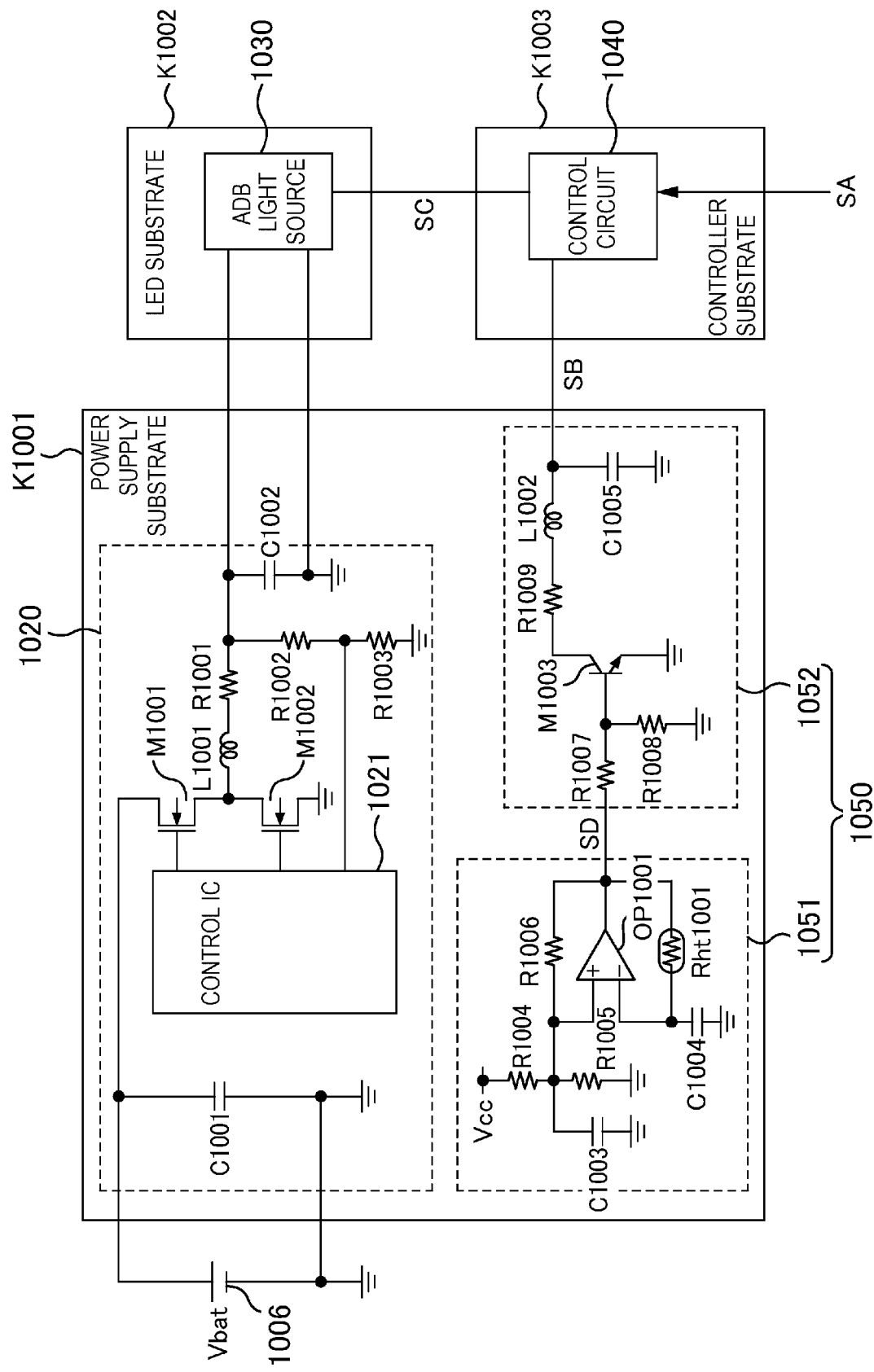
FIG. 15 is a diagram showing a configuration of a detection circuit 1050 in the third embodiment.

FIG. 14 is a diagram showing a configuration example of the ADB unit 1005. FIG. 15 is a diagram showing a configuration of a detection circuit 1050 (and a power supply circuit 1020) and the like in the third embodiment.

As shown in FIGS. 13 to 15, the ADB unit 1005 of the present embodiment includes a power supply substrate K1001, an LED substrate K1002, and a controller substrate K1003. The power supply circuit 1020 and the detection circuit 1050 are arranged on the power supply substrate K1001, the ADB light source 1030 is disposed on the LED substrate K2, and the control circuit 1040 is disposed on the controller substrate K1003. The substrates are connected by signal lines such as harnesses.

ADB Light Source 1030

The ADB light source 1030 is a light source using an output voltage (predetermined voltage) of the power supply circuit 1020 to be described later as a power supply, and corresponds to a "light source".

As shown in FIG. 14, the ADB light source 1030 includes a plurality of (N) light-emitting elements D1001 to D100N, a plurality of (N) current sources 31_1001 to 31_100N, and a light distribution adjustment circuit 1032.

The plurality of light-emitting elements D1001 to D100N and the plurality of current sources 31_1001 to 31_100N are respectively connected in series between the power supply line and the ground line. That is, in the ADB light source 1030, a plurality of combinations of the light-emitting elements and the current sources connected in series are arranged in parallel (connected in parallel).

The light-emitting elements D1001 to D100N are elements that are turned on by being supplied with a drive current, and in the present embodiment, LEDs (light-emitting diodes) are used. The plurality of light-emitting elements D1001 to D100N are connected in parallel, and are arranged side by side in, for example, an array form in order to form a light distribution pattern.

Each of the current sources 31_1001 to 31_100N supplies the drive current to the corresponding light-emitting element based on the output voltage of the power supply circuit 1020.

The light distribution adjustment circuit 1032 controls the current sources 31_1001 to 31_100N according to an instruction of the control circuit 1040 (signal SC input from the control circuit 1040) to adjust the drive current flowing through the plurality of light-emitting elements D1001 to D100N. Accordingly, it is possible to turn on lights with a light distribution pattern according to a situation of the vehicle. The light distribution adjustment circuit 1032 corresponds to an "adjustment unit".

A method of adjusting the drive current by the light distribution adjustment circuit 1032 is not particularly limited, and for example, PWM control or analog control can be applied. In the present embodiment, the current sources 31_1001 to 31_100N are constituted by a current mirror circuit, and a magnitude of the drive current flowing through one light-emitting element is adjusted, so that a magnitude of the drive current flowing through the other light-emitting elements is also changed accordingly.

Control Circuit 1040

Based on a signal SA from the lamp ECU 1002 (and a signal SB from the detection circuit 1050 to be described later), the control circuit 1040 generates the signal SC that collectively instructs the plurality of light-emitting elements D1001 to D100N to turn-on or turn-off, a luminance pattern, and the like, and outputs the signal SC to the ADB light source 1030 (light distribution adjustment circuit 1032). Accordingly, the control circuit 1040 controls the light distribution adjustment circuit 1032 to turn on each of the plurality of light-emitting elements D1001 to D100N at a desired brightness. The control circuit 1040 corresponds to a "control unit".

As described above, in the ADB light source 1030 of the present embodiment, the plurality of light-emitting elements D1001 to D100N are connected in parallel. In this case, a larger current is required as the number of light-emitting elements to be turned on is larger. For example, when the number of light-emitting elements is 1000 and a current required for turning on one light-emitting element is 10 mA, a total current supply capacity of 10 A (=10 mA×1000) is required. Therefore, heat generation in the power supply circuit 1020 that supplies power increases, and electronic components constituting the power supply circuit 1020 may be thermally destroyed.

Therefore, in the ADB unit 1005 of the present embodiment, the detection circuit 1050 is provided on the power supply substrate K1001 on which the power supply circuit 1020 is disposed. Based on the signal SB as the output of the detection circuit 1050 and the signal SA indicating the turn-on condition from the lamp ECU 1002, temperature derating is performed to reduce power consumption as a temperature increases.

Power Supply Circuit 1020

The power supply circuit 1020 is a voltage regulator that generates a predetermined voltage (for example, 5 V) based on the power supply voltage Vbat (for example, 12 V) supplied from the battery 1006 of the vehicle. The power supply circuit 1020 of the present embodiment is a step-down DC-DC converter (for example, a switching regulator). However, the present invention is not limited thereto, and for example, a linear regulator may be used, or a configuration including a step-up circuit and a step-down circuit (configuration of stepping down after stepping up) may be used.

The power supply circuit 1020 is a so-called synchronous rectification type circuit, and includes capacitors C1001 and C1002, transistors M1001 and M1002, a coil L1001, resistors R1001, R1002, and R1003, and a control IC1021 as shown in FIG. 15.

The capacitor C1001 is a capacitor on an input side, and has one end connected to the power supply line and the other end connected to the ground line (grounded).

Each of the transistors M1001 and M1002 is an NMOS-FET. A drain of the transistor M1001 is connected to one end of the capacitor C1001, and a source of the transistor M1001 is connected to a drain of the transistor M1002 and one end of the coil L1001. A source of the transistor M1002 is grounded. Gates of the transistors M1001 and M1002 are connected to the control IC 1021, and the transistors M1001 and M1002 are controlled to be turned on and off by the control IC 1021.

The other end of the coil L1001 is connected to one end of the capacitor C1002 on an output side via the resistor R1001. The other end of the capacitor C1002 is grounded. A voltage generated at both ends of the capacitor C1002 is an output voltage.

The resistor R1002 and the resistor R1003 are connected in series between the ground and a connection point of the resistor R1001 and one end of the capacitor C1002. A voltage at a connection point between the resistor R1002 and the resistor R1003 (voltage obtained by dividing the output voltage by the resistor R1002 and the resistor R1003) is transmitted to the control IC 1021.

The control IC 1021 switches the transistors M1001 and M1002 based on the voltage generated at the connection point between the resistor R1002 and the resistor R1003 such that the output voltage of the power supply circuit 1020 is the predetermined voltage.

When the transistor M1001 is turned on and the transistor M1002 is turned off, an input voltage (voltage of the capacitor C1001) is applied to the one end of the coil L1001. When the transistor M1001 is turned off and the transistor M1002 is turned on, a voltage of the ground line (ground voltage) is applied to the one end of the coil L1001.

By repeating the above operation, the output voltage of the power supply circuit 1020 is smaller than the input voltage (power supply voltage Vbat) and is controlled to be the predetermined voltage (for example, 5 V).

Detection Circuit 1050

The detection circuit 1050 is provided on the power supply substrate K1001 on which the power supply circuit 1020 is disposed, and includes a temperature detection circuit 1051 and an interface circuit (hereinafter, I/F circuit) 1052.

The temperature detection circuit 1051 is a circuit that is provided on the power supply substrate K1001 and detects a temperature. The temperature detection circuit 1051 of the present embodiment includes an oscillation circuit that outputs a signal SD having a frequency corresponding to the temperature. As shown in FIG. 15, the temperature detection circuit 1051 includes resistors R1004 to R1006, capacitors C1003 and C1004, a thermistor Rth1001, and an operational amplifier OP1001.

The resistor R1004 and the resistor R1005 are connected in series, a voltage Vcc is applied to one end (one end of the resistor R1004), and the other end (the other end of the resistor R1005) is grounded.

One end of the capacitor C1003 is connected to a connection point between the resistor R1004 and the resistor R1005 connected in series, and the other end is grounded.

An inverting input terminal (−terminal) of the operational amplifier OP1001 is grounded via the capacitor C1004 and is connected to an output of the operational amplifier OP1001 via the thermistor Rth1001. The thermistor Rth1001 is an electronic component whose resistance value changes according to a change in temperature (see FIG. 16).

A non-inverting input terminal (+terminal) of the operational amplifier OP1001 is connected to the connection point between the resistor R1004 and the resistor R1005 and is connected to the output of the operational amplifier OP1001 via the resistor R1006.

The temperature detection circuit 1051 is obtained by replacing a part of the resistor (resistor connected between the −terminal and the output) with the thermistor Rth1001 in the oscillation circuit using the operational amplifier OP1001. As a resistance value of the thermistor Rth1001 changes according to a temperature, a frequency of an output signal (signal SD) changes. The signal SD corresponds to a "first signal". As the temperature detection circuit 1051, it is sufficient to output a signal SD having a frequency corresponding to the resistance value of the thermistor Rth1001, and thus for example, a Hartley oscillation circuit or a Wien bridge oscillation circuit may be used.

The I/F circuit 1052 is a circuit that converts the signal SD, which is an output of the temperature detection circuit 1051, into a signal (signal SB) of logic level. The signal of logic level is a rectangular wave signal that switches between a high level (hereinafter, referred to as an H level) and a low level (hereinafter, referred to as an L level).

The I/F circuit 1052 includes a transistor M1003, resistors R1007 to R1009, a coil L1002, and a capacitor C1005. The coil L1002 and the capacitor C1005 are connected to a pull-up resistor (not shown) inside the control circuit 1040.

The transistor M1003 is an NPN transistor, and has an emitter grounded and a collector connected to one end of the coil L1002 via the resistor R1009. The power is supplied from, for example, the control circuit 1040 to the collector of the NPN transistor M1003. A base of the NPN transistor M1003 is connected to a connection point between the resistor R1007 and the resistor R1008 connected in series between the output of the temperature detection circuit 1051 (output of the operational amplifier OP1001) and the ground. That is, a voltage obtained by dividing the output (signal SD) of the temperature detection circuit 1051 by the resistor R1007 and the resistor R1008 is applied to the base of the NPN transistor M1003.

One end of the capacitor C1005 is connected to the other end of the coil L1002, and the other end of the capacitor C1005 is grounded. The coil L1002 and the capacitor C1005 constitute a noise removal filter. A voltage between both ends of the capacitor C1005 is an output of the detection circuit 1050. With the above configuration, when the NPN transistor M1003 is turned on, an L-level signal is output, and when the NPN transistor M1003 is turned off, an H-level signal is output. Accordingly, an output (signal SB) of the I/F circuit 1052 is a rectangular wave signal (signal of logic level) indicating temperature information based on the signal SD (oscillation signal). Accordingly, even when the signal SB is transmitted to the control circuit 1040 of the controller substrate K1003 via the harness, it is possible to reduce an influence of noise (increase noise resistance) because the signal SB is a rectangular wave signal.

Figure 16:
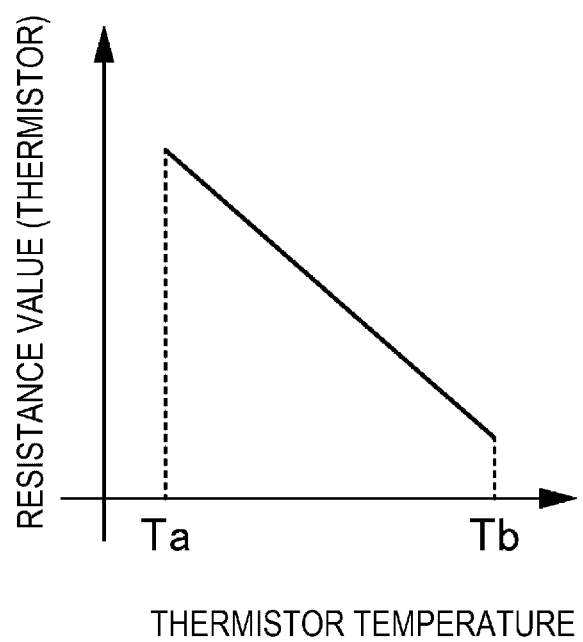
FIG. 16 is a diagram illustrating a relationship between temperature information of a temperature detection circuit 1051 and temperature derating.
Figure 17:
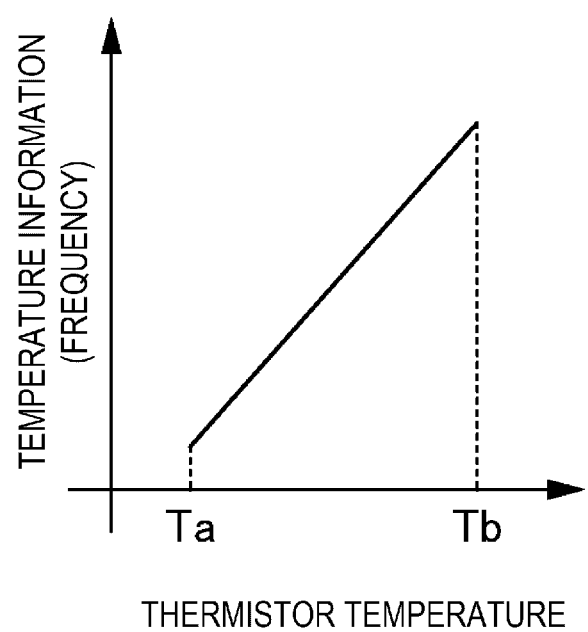
FIG. 17 is a diagram illustrating the relationship between the temperature information of the temperature detection circuit 1051 and the temperature derating.
Figure 18:
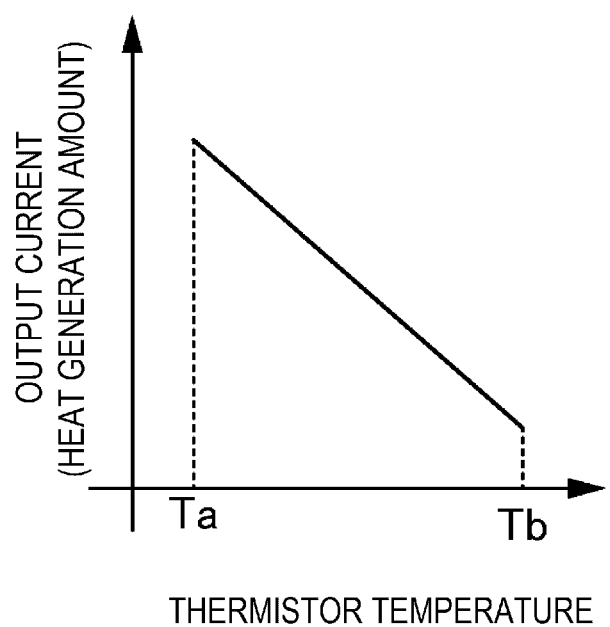
FIG. 18 is a diagram illustrating the relationship between the temperature information of the temperature detection circuit 1051 and the temperature derating.

FIGS. 16 to 18 are diagrams illustrating a relationship between temperature information of the temperature detection circuit 1051 and the temperature derating. A horizontal axis in FIGS. 16 to 18 indicates a temperature of the thermistor Rth1001. A vertical axis in FIG. 16 indicates a resistance value of the thermistor Rth1001, a vertical axis in FIG. 17 indicates the temperature information (frequency of oscillation of the signal SD) of the temperature detection circuit 1051, and a vertical axis in FIG. 18 indicates a magnitude of an output current (drive current flowing through the light-emitting element) of the ADB light source 1030.

As shown in FIG. 16, the resistance value of the thermistor Rth1001 decreases as the temperature increases. Accordingly, as shown in FIG. 17, the frequency of oscillation of the signal SD increases as a thermistor temperature increases.

Based on the signal SD of the temperature detection circuit 1051 and the signal SA indicating the light distribution pattern (turn-on condition) from the lamp ECU 1002, the control circuit 1040 generates the signal SC such that the power consumption (drive current flowing through the light-emitting element) is reduced in accordance with an increase in frequency (increase in temperature) as shown in FIG. 18, and controls the light distribution adjustment circuit 1032 (performs the temperature derating). Accordingly, it is possible to prevent the heat generation, and it is possible to prevent the electronic components from being destroyed. A range of the temperature information (frequency) for performing the temperature derating (range corresponding to temperatures Ta to Tb) is designed in accordance with a specification of the control circuit 1040 on an information receiving side.

In the present embodiment, the control circuit 1040 controls the light distribution adjustment circuit 1032 such that the drive current flowing through each of the light-emitting elements D1001 to D100N decreases without changing the number of light-emitting elements to be turned on among the light-emitting elements D1001 to D100N when the temperature derating is performed. Accordingly, the power consumption can be reduced (heat generation can be prevented) without affecting the light distribution pattern. However, the present invention is not limited thereto, and for example, an upper limit value of the drive current flowing through each light-emitting element may be lowered, or the light distribution pattern may be changed.

Fourth Embodiment

Figure 19:
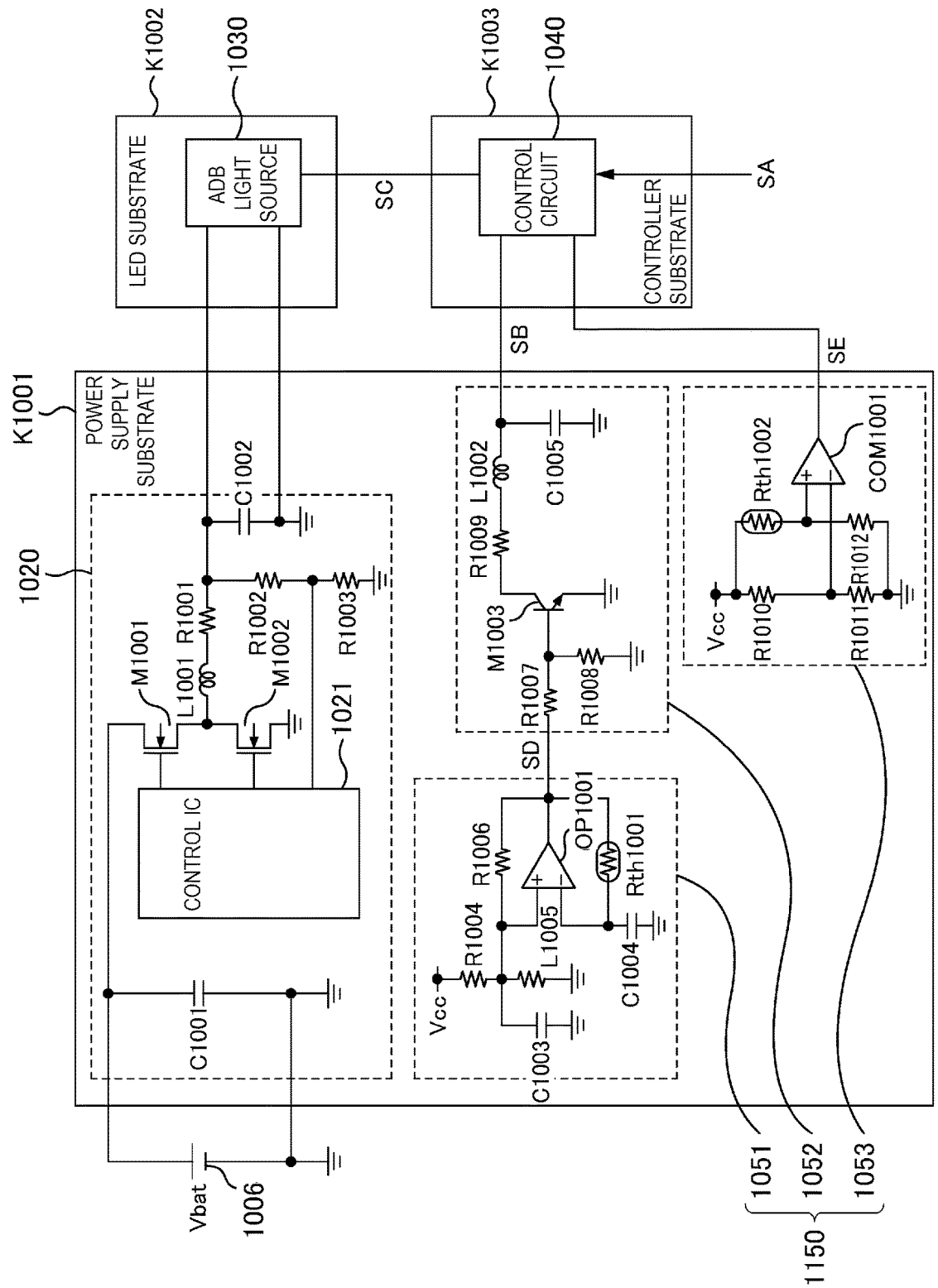
FIG. 19 is a diagram showing a configuration of a detection circuit 1150 in a fourth embodiment.

FIG. 19 is a diagram showing a configuration of a detection circuit 1150 in a fourth embodiment. In FIG. 19, parts having the same configuration as those in FIG. 15 are denoted by the same reference numerals, and the description thereof is omitted. In the fourth embodiment, the power supply circuit 1020 and the detection circuit 1150 are provided on the power supply substrate K1001.

The detection circuit 1150 includes the temperature detection circuit 1051, the I/F circuit 1052, and a signal output circuit 1053.

The signal output circuit 1053 is a circuit that outputs a signal SE serving as a trigger when temperature derating is performed, separately from the temperature detection circuit 1051, and includes resistors R1010 to R1012, a thermistor Rth1002, and a comparator COM1001. The signal output circuit 1053 corresponds to an "output circuit", and the signal SE corresponds to a "third signal".

The resistor R1010 and the resistor R1011 are connected in series, the voltage Vcc is applied to one end (end of the resistor R1010), and the other end (end of the resistor R1011) is grounded. The thermistor Rth1002 and the resistor R1012 are also connected in series, the voltage Vcc is applied to one end (end of the thermistor Rth1002), and the other end (end of the resistor R1012) is grounded.

An inverting input terminal (−terminal) of the comparator COM1001 is connected to a connection point between the resistor R1010 and the resistor R1011, and a non-inverting input terminal (+terminal) is connected to a connection point between the thermistor Rth1002 and the resistor R1012. The comparator COM1001 compares the voltage of the +terminal and the voltage of the −terminal, and outputs a comparison result. The comparator COM1001 of the present embodiment is of an open drain type, and outputs an open (high impedance) voltage when a voltage of the +terminal is larger than a voltage of the −terminal, and outputs an L level (ground level) voltage when the voltage of the +terminal is smaller than the voltage of the −terminal. Each of resistance values of the resistors R1010, R1011, and R1012 is set such that an output of the comparator COM1001 is switched at the temperature Ta in FIGS. 16 to 18 according to a change in resistance of the thermistor Rth1002.

When a temperature of the power supply substrate K1001 is higher than the predetermined temperature Ta, the resistance of the thermistor Rth1002 is small, and thus the voltage of the +terminal of the comparator COM1001 is larger than the voltage of the −terminal. Accordingly, the output of the comparator COM1001 is opened. When a temperature is equal to or lower than the predetermined temperature Ta, the resistance of the thermistor Rth1002 increases, and the voltage of the −terminal of the comparator COM1001 is larger than the voltage of the +terminal. Accordingly, the output of the comparator COM1001 is at the L level. The output of the comparator COM1001 is output to the control circuit 1040 as the signal SE. The predetermined temperature Ta corresponds to a "second temperature".

The control circuit 1040 of the fourth embodiment also receives an output signal (signal SE) of the signal output circuit 1053 in addition to the signal SB. The control circuit 1040 does not perform the temperature derating when the signal SE is at the L level. That is, the plurality of light-emitting elements D1001 to D100N are turned on based on the signal SA from the lamp ECU 1002 regardless of the signal SB as the output of the I/F circuit 1052 (in other words, the signal SD as the output of the temperature detection circuit 1051).

Accordingly, even when an oscillation operation is unstable due to conditions (operational amplifier OP1001, the resistance value of each resistor, or the like) of the temperature detection circuit 1051 (oscillation circuit) for example near the temperature Ta, an output (signal SE) of the signal output circuit 1053 can be used as a trigger to stop the temperature derating. In the present embodiment, the signal output circuit 1053 detects a lower limit (temperature Ta) of a range where the temperature derating is required, but a circuit for detecting an upper limit (temperature Tb) may also be provided. Accordingly, the temperature derating can be reliably performed within a temperature range where the temperature derating is required.

Fifth Embodiment

Figure 20:
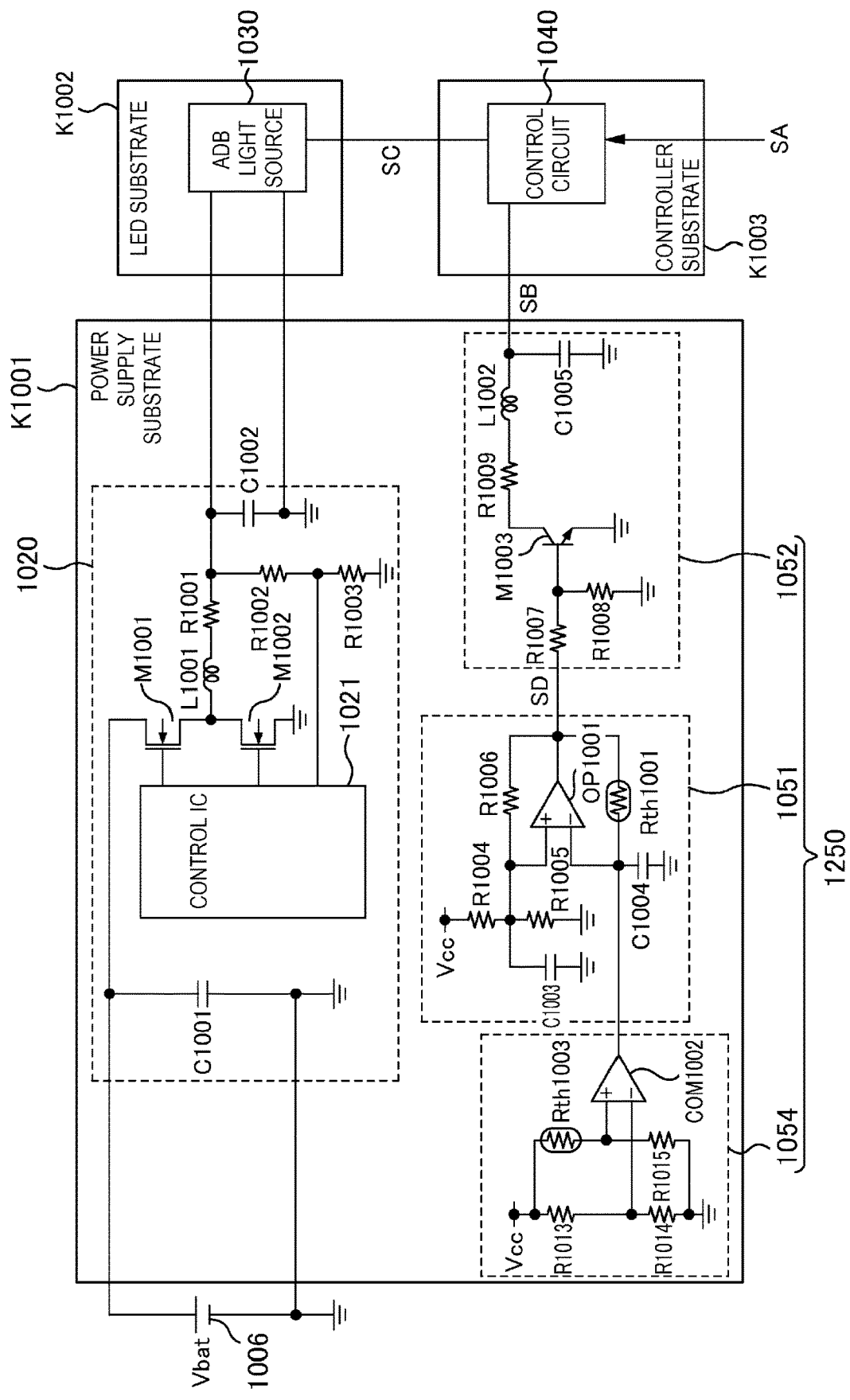
FIG. 20 is a diagram showing a configuration of a detection circuit 1250 in a fifth embodiment.

FIG. 20 is a diagram showing a configuration of a detection circuit 1250 in the fifth embodiment. In FIG. 20, parts having the same configuration as those in FIGS. 15 and 19 are denoted by the same reference numerals, and the description thereof is omitted. In the fifth embodiment, the power supply circuit 1020 and the detection circuit 1250 are provided on the power supply substrate K1001.

The detection circuit 1250 includes the temperature detection circuit 1051, the I/F circuit 1052, and an oscillation stop circuit 1054.

The oscillation stop circuit 1054 includes resistors R1013 to R1015, a thermistor Rth1003, and a comparator COM1002. As shown in FIG. 20, the oscillation stop circuit 1054 has the same configuration as that of the signal output circuit 1053 of the fourth embodiment (FIG. 19), and thus the description thereof is omitted. An output of the oscillation stop circuit 1054 (output of the comparator COM1002) is connected to a connection point between the −terminal of the operational amplifier OP1001 of the temperature detection circuit 1051, the thermistor Rth1001, and the capacitor C1004. The oscillation stop circuit 1054 corresponds to a "stop circuit".

When a temperature of the power supply substrate K1001 is higher than, for example, the temperature Ta in FIGS. 16 to 18, a voltage of a +terminal of the comparator COM1002 is larger than a voltage of a −terminal. Accordingly, the output of the comparator COM1002 is opened. Thus, as in the third embodiment, the temperature detection circuit 1051 performs an oscillation operation (temperature detection) corresponding to the temperature, and temperature derating is performed based on a result.

On the other hand, when a temperature is equal to or lower than the temperature Ta, a resistance of the thermistor Rth1003 increases, and the voltage of the −terminal of the comparator COM1002 is larger than the voltage of the +terminal. Accordingly, the output of the comparator COM1002 is at the L level. When the output of the comparator COM1002 is at the L level, the −terminal of the operational amplifier OP1001 is at the ground level, and the operational amplifier OP1001 does not oscillate (oscillation operation is forcibly stopped). In this way, when a temperature is equal to or lower than the temperature Ta, the oscillation stop circuit 1054 stops an operation of the temperature detection circuit 1051. Accordingly, the temperature derating is not performed. The temperature Ta at this time corresponds to a "first temperature".

Also in the fifth embodiment, the output of the oscillation stop circuit 1054 can be used as a trigger to stop the temperature derating.

Sixth Embodiment

Figure 21:
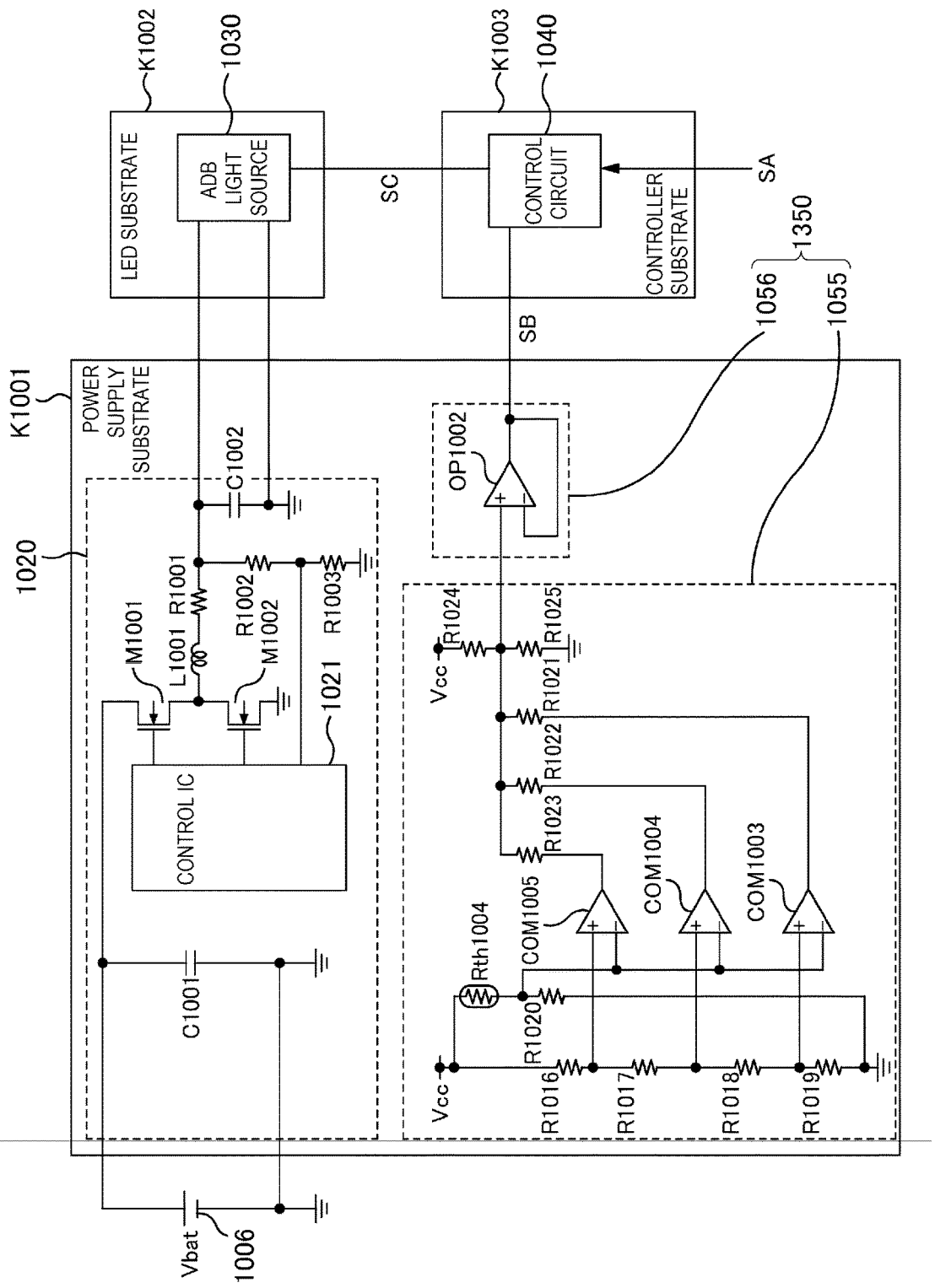
FIG. 21 is a diagram showing a configuration of a detection circuit 1350 in a sixth embodiment.

FIG. 21 is a diagram showing a configuration of a detection circuit 1350 in a sixth embodiment. In FIG. 21, parts having the same configuration as those in FIGS. 15, 19, and 20 are denoted by the same reference numerals, and the description thereof is omitted. In the sixth embodiment, the power supply circuit 1020 and the detection circuit 1350 are provided on the power supply substrate K1001.

The detection circuit 1350 includes a temperature detection circuit 55 and a buffer circuit 56.

The temperature detection circuit 55 includes resistors R1016 to R1025, comparators COM1003 to COM1005, and a thermistor Rth1004.

The resistors R1016 to R1019 are connected in series, the voltage Vcc is applied to one end (end of the resistor R1016), and the other end (end of the resistor R1019) is grounded.

The thermistor Rth1004 and the resistor R1020 are connected in series and are provided in parallel with the resistors R1016 to R1019. That is, the voltage Vcc is applied to one end (end of the thermistor Rth1004) of the thermistor Rth1004 and the resistor R1020 connected in series, and the other end (end of the resistor R1020) is grounded.

The resistor R1024 and the resistor R1025 are connected in series, the voltage Vcc is applied to one end (end of the resistor R1024), and the other end (end of the resistor R1025) is grounded.

A voltage at a connection point between the thermistor Rth1004 and the resistor R1020 is applied to an inverting input terminal (−terminal) of the comparator COM1003, and a voltage at a connection point between the resistor R1018 and the resistor R1019 is applied to a non-inverting input terminal (+terminal). An output of the comparator COM1003 is connected to a connection point between the resistor R1024 and the resistor R1025 via the resistor R1021.

The voltage at the connection point between the thermistor Rth1004 and the resistor R1020 is applied to a −terminal of the comparator COM1004, and a voltage at a connection point between the resistor R1017 and the resistor R1018 is applied to a +terminal. The output of the comparator COM1003 is connected to the connection point between the resistor R1024 and the resistor R1025 via the resistor R1022.

The voltage at the connection point between the thermistor Rth1004 and the resistor R1020 is applied to a −terminal of the comparator COM1005, and a voltage at a connection point between the resistor R1016 and the resistor R1017 is applied to a +terminal. The output of the comparator COM1003 is connected to the connection point between the resistor R1024 and the resistor R1025 via the resistor R1023.

Each of the comparators COM1003, COM1004, and COM1005 is an open drain comparator, and outputs an open (high impedance) voltage when a voltage of the +terminal is larger than a voltage of the −terminal, and outputs an L level (ground level) voltage when the voltage of the +terminal is smaller than the voltage of the −terminal.

The buffer circuit 56 is a circuit that prevents an output voltage from fluctuating according to an input impedance, and includes an operational amplifier OP1002 (voltage follower) whose output is negatively fed back. An output voltage of the temperature detection circuit 55 (voltage of a connection node between the resistor R1024 and the resistor R1025) is applied to a +terminal of the operational amplifier OP1002, and the output of the operational amplifier OP1002 is transmitted to the control circuit 1040 as the signal SB.

Next, an operation of the detection circuit 1350 (temperature detection circuit 55) will be described.

FIGS. 22 to 25 are diagrams illustrating a relationship between temperature information of the temperature detection circuit 55 and temperature derating. A horizontal axis in FIGS. 22 to 25 indicates a temperature of the thermistor Rth1004. A vertical axis in FIG. 22 indicates a resistance value of the thermistor Rth1004, and a vertical axis in FIG. 23 indicates a magnitude of an input of the −terminal of each of the comparators (comparator COM1003, COM1004, and COM1005). A vertical axis in FIG. 24 indicates an output (signal SB) of the detection circuit 1350, and a vertical axis in FIG. 25 indicates a magnitude of an output current (drive current flowing through each light-emitting element) of the ADB light source 1030.

Figure 22:
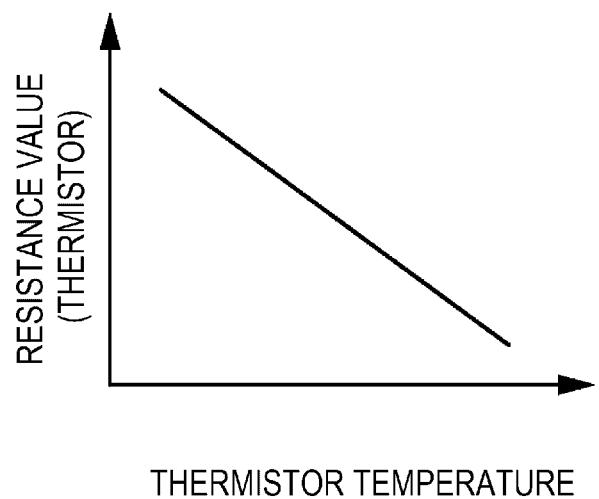
FIG. 22 is a diagram illustrating a relationship between temperature information of a temperature detection circuit 1055 and temperature derating.
Figure 23:
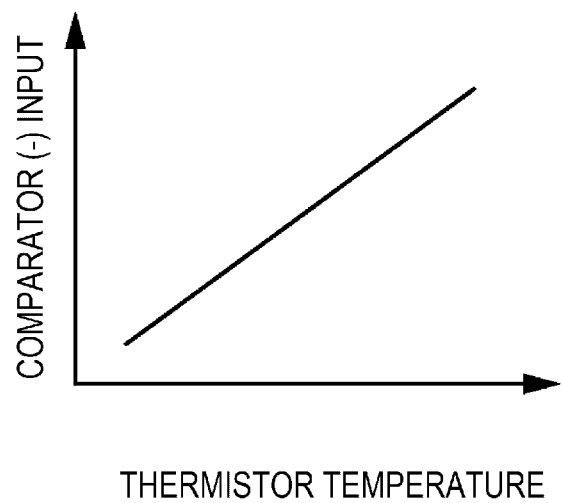
FIG. 23 is a diagram illustrating the relationship between the temperature information of the temperature detection circuit 1055 and the temperature derating.

As shown in FIG. 22, the resistance value of the thermistor Rth1004 decreases as the temperature increases. Accordingly, as shown in FIG. 23, an input voltage of the −terminal of each of the comparators (comparators COM1003, COM1004, and COM1005) increases as a thermistor temperature increases. The input voltage corresponds to a "first voltage" corresponding to a temperature, and the thermistor Rth1004 and the resistor R1020 correspond to a "voltage generation circuit" that generates the input voltage (first voltage).

Figure 24:
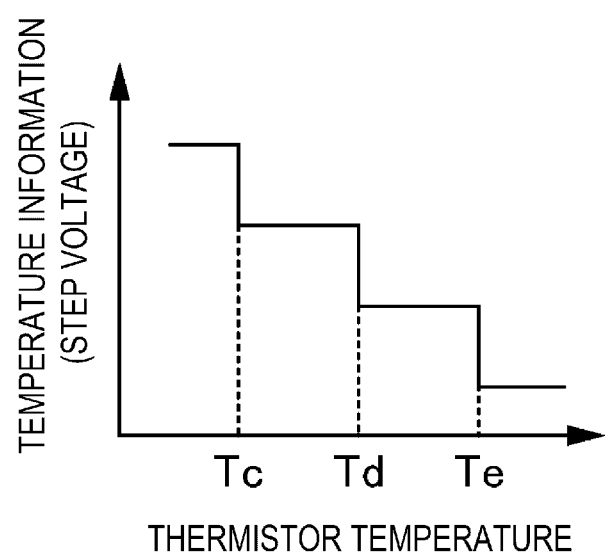
FIG. 24 is a diagram illustrating the relationship between the temperature information of the temperature detection circuit 1055 and the temperature derating.
Figure 25:
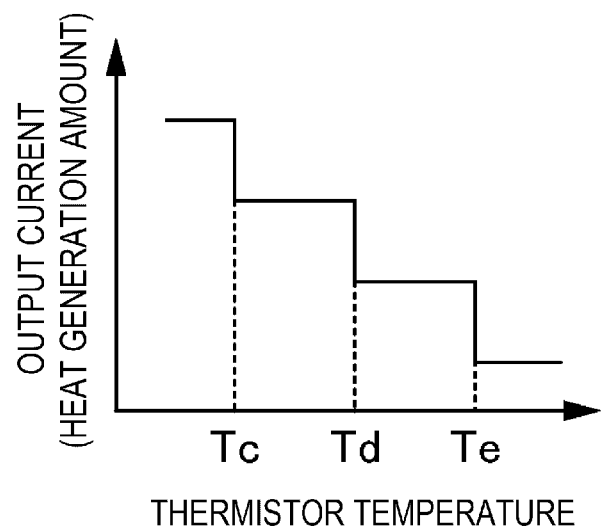
FIG. 25 is a diagram illustrating the relationship between the temperature information of the temperature detection circuit 1055 and the temperature derating.

When a temperature is equal to or lower than a temperature Tc shown in FIG. 24, the comparators COM1003, COM1004, and COM1005 are opened. Therefore, a voltage obtained by dividing the voltage Vcc by the resistor R1024 and the resistor R1025 is output as the signal SB. The control circuit 1040 does not perform the temperature derating when a temperature is equal to or lower than the temperature Tc. That is, in the present embodiment, the temperature Tc corresponds to a "second temperature", and the control circuit 1040 turns on the plurality of light-emitting elements D1001 to D100N of the ADB light source 1030 based on the signal SA from the lamp ECU 1002 regardless of the signal SB when a temperature is equal to or lower than the temperature Tc.

When a temperature exceeds the temperature Tc, the voltage of the −terminal of the comparator COM1003 is larger than the voltage of the +terminal, and the output of the comparator COM1003 is at the L level (ground level). Accordingly, the resistor R1021 is grounded, and thus as shown in FIG. 24, the output voltage (voltage of the signal SB) decreases as compared with when the temperature is equal to or lower than the temperature Tc. In this case, the control circuit 1040 controls the light distribution adjustment circuit 1032 to perform the temperature derating such that the drive current flowing through each light-emitting element becomes smaller (for example, 80% of the drive current when a temperature is equal to or lower than the temperature Tc).

When a temperature exceeds a temperature Td (>Tc), the voltage of the −terminal of the comparator COM1004 is larger than the voltage of the +terminal, and an output of the comparator COM1004 is at the L level (ground level). Accordingly, the resistor R1022 is grounded, and thus as shown in FIG. 24, the output voltage (voltage of the signal SB) still decreases. In this case, the control circuit 1040 controls the light distribution adjustment circuit 1032 to perform the temperature derating such that the drive current flowing through each light-emitting element becomes still smaller (for example, 60% of the drive current when the temperature is equal to or lower than the temperature Tc).

Further, when a temperature exceeds a temperature Te (>Td), the voltage of the −terminal of the comparator COM1005 is larger than the voltage of the +terminal, and an output of the comparator COM1005 is at the L level (ground level). Accordingly, the resistor R1023 is grounded, and thus as shown in FIG. 24, the output voltage (voltage of the signal SB) further decreases. In this case, the control circuit 1040 controls the light distribution adjustment circuit 1032 to perform the temperature derating such that the drive current flowing through each light-emitting element becomes further smaller (for example, 40% of the drive current when the temperature is equal to or lower than the temperature Tc).

In the sixth embodiment, the voltage (input voltage of the −terminal of each comparator) that changes as the thermistor temperature increases is converted into a stepwise voltage as shown in FIG. 24. The stepwise voltage corresponds to a "second voltage", and a portion of the temperature detection circuit 55 excluding the thermistor Rth1004 and the resistor R1020 corresponds to a "voltage conversion circuit".

In this way, also in the sixth embodiment, by performing the temperature derating according to a detection result of the temperature detection circuit 55, it is possible to prevent heat generation, and it is possible to prevent electronic components from being destroyed.

In the sixth embodiment, by forming a stepwise waveform (voltage) as shown in FIG. 24, when a signal is transmitted from the temperature detection circuit 55 to the control circuit 1040 via the harness, it is possible to reduce an influence of noise (increase noise resistance).

Summary

The vehicle lamp 1 of the first embodiment and the second embodiment has been described above. The vehicle lamp 1 is a lamp used for a vehicle, and includes the power supply circuit 20 that is provided on the power supply substrate K1 and generates the predetermined voltage based on the power supply voltage Vbat, the ADB light source 30 provided on the LED substrate K2, and the control circuit 40 provided on the controller substrate K3. The ADB light source 30 is a light source using a predetermined voltage as a power supply, and includes the plurality of light-emitting elements D1 to DN, and the light distribution adjustment circuit 32 that adjusts the drive current flowing through each of the plurality of light-emitting elements D1 to DN. The power supply substrate K1 of the first embodiment is provided with the temperature detection circuit 51 for detecting the temperature. The LED substrate K2 is provided with the temperature detection circuit 61 for detecting the temperature. The control circuit 40 controls the light distribution adjustment circuit 32 based on the detection result having the higher temperature among the detection results of the temperature detection circuits 51 and 61 and the signal SA indicating the turn-on condition of the plurality of light-emitting elements D1 to DN. Accordingly, it is possible to efficiently prevent the heat generation in the power supply substrate K1 and the LED substrate K2, and it is possible to prevent the electronic components from being destroyed.

Each of the temperature detection circuits 51 and 61 is the oscillation circuit that oscillates at the frequency corresponding to the temperature. Accordingly, temperatures of the power supply substrate K1 and the LED substrate K2 can be detected based on respective frequencies.

The power supply substrate K1 is provided with the I/F circuit 52 that converts the output signal SD1 of the temperature detection circuit 51 into the signal SB1 of logic level, and the LED substrate K2 is provided with the I/F circuit 62 that converts the output signal SD2 of the temperature detection circuit 61 into the signal SB2 of logic level. Accordingly, it is possible to reduce an influence of noise (increase noise resistance).

In the second embodiment, the power supply substrate K1 is provided with the temperature detection circuit 53 including the resistor R16 and the thermistor Rth3, and the LED substrate K2 is provided with the temperature detection circuit 63 including the resistor R17 and the thermistor Rth4. Accordingly, the temperatures of the power supply substrate K1 and the LED substrate K2 can be detected with a simple configuration.

The voltage conversion circuit 70 is provided to convert each of the detection result of the temperature detection circuit 53 and the detection result of the temperature detection circuit 63 into a stepwise voltage waveform. Accordingly, the noise resistance can be increased.

The voltage conversion circuit 70 is provided on the controller substrate K3. Accordingly, the detection result of the temperature detection circuit 53 and the detection result of the temperature detection circuit 63 can be converted by one voltage conversion circuit 70, and thus it is possible to reduce the number of components and save space.

The control circuit 40 controls the adjustment unit such that the drive current flowing through each of the plurality of light-emitting elements D1 to DN decreases without changing the number of light-emitting elements to be turned on among the plurality of light-emitting elements D1 to DN when the temperature derating is performed. Accordingly, the power consumption can be reduced without affecting the light distribution pattern.

The lamp (vehicle lamp 1) of the present embodiment can be suitably used for a headlamp (in particular, ADB) of a vehicle. However, the present invention is not limited thereto, and for example, the lamp may be applied to a street light. Also in this case, the same effect can be obtained.

The vehicle lamp 1001 of the third to sixth embodiments has been described. The vehicle lamp 1001 is a lamp used for a vehicle, includes the power supply circuit 1020 that generates a predetermined voltage obtained by stepping down the power supply voltage Vbat, the plurality of light-emitting elements D1001 to D100N, and the light distribution adjustment circuit 1032 that adjusts the drive current flowing through each of the plurality of light-emitting elements D1001 to D100N, and includes the ADB light source 1030 that uses the predetermined voltage as a power supply. In the third embodiment, the temperature detection circuit 1051 that is provided on the power supply substrate K1001 on which the power supply circuit 1020 is disposed and detects the temperature, and the control circuit 1040 that controls the light distribution adjustment circuit 1032 based on the signal SD from the temperature detection circuit 1051 and the signal SA indicating the turn-on condition of the plurality of light-emitting elements D1001 to D100N are provided. Accordingly, the power consumption can be reduced when the temperature increases, and thus it is possible to prevent the heat generation, and to prevent the electronic components from being destroyed.

The temperature detection circuit 1051 of the third to fifth embodiments is the oscillation circuit that outputs the signal SD having the frequency corresponding to the temperature by using the thermistor Rth1001 whose resistance changes according to the temperature. Accordingly, the temperature can be detected based on the frequency of oscillation.

The third to fifth embodiments include the I/F circuit 1052 that converts the signal SD into the signal SB of logic level. Accordingly, when the signal SB is transmitted to the control circuit 1040, the noise resistance can be increased.

The fifth embodiment includes the oscillation stop circuit 1054 that is provided on the power supply substrate K1001 and stops the operation of the temperature detection circuit 1051 when a temperature is equal to or lower than the temperature Ta. Accordingly, an accuracy of the temperature when the temperature derating is performed can be increased.

The temperature detection circuit 55 of the sixth embodiment includes the voltage generation circuit (thermistor Rth1004 and resistor R1020) that generates a voltage corresponding to a temperature, and the voltage conversion circuit (portion of the temperature detection circuit 55 excluding the thermistor Rth1004 and the resistor R1020) that converts the voltage into a stepwise voltage and outputs the stepwise voltage as the signal SB. Accordingly, when the signal SB is transmitted to the control circuit 1040, the noise resistance can be increased.

When a detected temperature is equal to or lower than the temperature Ta (temperature Tc in the sixth embodiment), the control circuit 1040 of the third to fifth embodiments turns on the plurality of light-emitting elements D1001 to D100N based on the signal SA regardless of the signal SB. Accordingly, the temperature derating can be omitted within a temperature range where the temperature derating is not required.

The fourth embodiment includes the signal output circuit 1053 that outputs the signal SE indicating that the temperature is equal to or lower than Ta to the control circuit 1040. Accordingly, the accuracy of the temperature at which the temperature derating is performed can be increased.

The control circuit 1040 controls the adjustment unit such that the drive current flowing through each of the plurality of light-emitting elements D1001 to D100N decreases without changing the number of light-emitting elements to be turned on among the plurality of light-emitting elements D1001 to D100N when the temperature derating is performed. Accordingly, the power consumption can be reduced without affecting the light distribution pattern.

The lamp (vehicle lamp 1001) of the present embodiment can be suitably used for a headlamp (in particular, ADB) of a vehicle. However, the present invention is not limited thereto, and for example, the lamp may be applied to a street light. Also in this case, the same effect can be obtained.

The embodiments described above are intended to facilitate understanding of the present disclosure, and are not to be construed as limiting the present disclosure. In addition, it is needless to say that the present disclosure can be changed or improved without departing from the inventive concept thereof, and equivalents thereof are included in the present disclosure. For example, the forms shown below may be used.

In the embodiments described above, the control circuit 40 and the light distribution adjustment circuit 32 are provided separately, but may be constituted by, for example, a part of a microcomputer functioning as a control unit and an adjustment unit.

In the second embodiment, each of the detection results of the temperature detection circuits 51 and 61 is converted into a stepwise voltage by the voltage conversion circuit 70, but the voltage may be transmitted to the control circuit 40 without being converted (as an analog voltage). The temperature derating may be performed based on one of the detection results (one having a higher temperature) and the signal SA.

In the embodiments described above, the circuits of the ADB unit 1005 are provided on three substrates (power supply substrate K1001, LED substrate K1002, and controller substrate K1003), but may be provided on one substrate.

The control circuit 1040 and the light distribution adjustment circuit 1032 may be constituted by, for example, a part of a microcomputer functioning as a control unit and an adjustment unit.

The present application is based on Japanese Patent Application No. 2021-121237 filed on Jul. 26, 2021 and Japanese Patent Application No. 2021-117947 filed on Jul. 16, 2021, and the contents are incorporated herein by reference.

The invention claimed is:
1. A lamp comprising:
a power supply circuit provided on a first substrate and configured to generate a predetermined voltage based on a power supply voltage;
a light source that is provided on a second substrate, includes a plurality of light-emitting elements and an adjustment unit configured to adjust a drive current flowing through each of the plurality of light-emitting elements, and uses the predetermined voltage as a power supply;

a control unit provided on a third substrate and configured to control the adjustment unit;
a first temperature detection circuit provided on the first substrate and configured to detect a temperature; and
a second temperature detection circuit provided on the second substrate and configured to detect a temperature, wherein
the control unit is configured to control the adjustment unit based on a detection result having a higher temperature of detection results of the first and second temperature detection circuits and a signal indicating a turn-on condition of the plurality of light-emitting elements.

2. The lamp according to claim 1, wherein each of the first and second temperature detection circuits is an oscillation circuit configured to oscillate at a frequency corresponding to a temperature.

3. The lamp according to claim 2, wherein
the first substrate is provided with a first interface circuit configured to convert an output signal of the first temperature detection circuit into a signal of logic level, and
the second substrate is provided with a second interface circuit configured to convert an output signal of the second temperature detection circuit into a signal of logic level.

4. The lamp according to claim 1, wherein each of the first and second temperature detection circuits includes a resistor and a thermistor.

5. The lamp according to claim 4, further comprising:
a voltage conversion circuit configured to convert a detection result of each of the first and second temperature detection circuits into a stepwise voltage waveform.

6. The lamp according to claim 5, wherein the voltage conversion circuit is provided on the third substrate.

7. The lamp according to claim 1, wherein the control unit is configured to control the adjustment unit such that the drive current flowing through each of the plurality of light-emitting elements decreases without changing the number of light-emitting elements to be turned on among the plurality of light-emitting elements.

8. The lamp according to claim 1, wherein the lamp is used for a vehicle.

9. A lamp comprising:
a power supply circuit configured to generate a predetermined voltage based on a power supply voltage;
a light source that includes a plurality of light-emitting elements and an adjustment unit configured to adjust a drive current flowing through each of the plurality of light-emitting elements, and uses the predetermined voltage as a power supply;
a temperature detection circuit provided on a substrate on which the power supply circuit is disposed and configured to detect a temperature; and
a control unit configured to control the adjustment unit based on a first signal from the temperature detection circuit and a second signal indicating a turn-on condition of the plurality of light-emitting elements,
wherein the temperature detection circuit is an oscillation circuit configured to output the first signal having a frequency corresponding to a temperature.

10. The lamp according to claim 9, further comprising:
an interface circuit configured to convert the first signal into a signal of logic level.

11. The lamp according to claim 9, further comprising:
a stop circuit provided on the substrate and configured to stop an operation of the oscillation circuit when a temperature is equal to or lower than a first temperature.

12. The lamp according to claim 9, wherein the temperature detection circuit includes
a voltage generation circuit configured to generate a first voltage corresponding to a temperature, and
a voltage conversion circuit configured to convert the first voltage into a stepwise second voltage and output the second voltage as the first signal.

13. The lamp according to claim 9, wherein the control unit is configured to turn on the plurality of light-emitting elements based on the second signal regardless of the first signal when a detected temperature is equal to or lower than a second temperature.

14. The lamp according to claim 13, further comprising:
an output circuit configured to output a third signal indicating that a temperature is equal to or lower than the second temperature to the control unit.

15. The lamp according to claim 9, wherein the control unit is configured to control the adjustment unit such that the drive current flowing through each of the plurality of light-emitting elements decreases without changing the number of light-emitting elements to be turned on among the plurality of light-emitting elements.

16. The lamp according to claim 9, wherein the lamp is used for a vehicle.

* * * * *